(12) United States Patent
Tang

(10) Patent No.: US 11,102,677 B2
(45) Date of Patent: Aug. 24, 2021

(54) WIRELESS COMMUNICATION METHOD AND DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 283 days.

(21) Appl. No.: 16/311,117

(22) PCT Filed: Sep. 23, 2016

(86) PCT No.: PCT/CN2016/099873
§ 371 (c)(1),
(2) Date: Dec. 18, 2018

(87) PCT Pub. No.: WO2018/053806
PCT Pub. Date: Mar. 29, 2018

(65) Prior Publication Data
US 2020/0314698 A1 Oct. 1, 2020

(51) Int. Cl.
*H04L 1/00* (2006.01)
*H04L 1/20* (2006.01)
(Continued)

(52) U.S. Cl.
CPC ........... *H04W 28/06* (2013.01); *H04L 1/0009* (2013.01); *H04L 1/0023* (2013.01);
(Continued)

(58) Field of Classification Search
CPC ........ H04B 7/02–17; H04B 7/24–2696; H04L 1/0001–0693; H04L 1/20–248;
(Continued)

(56) References Cited

U.S. PATENT DOCUMENTS

2008/0013528 A1* 1/2008 Miller .................. H04W 28/22
2012/0327802 A1 12/2012 Jung et al.
(Continued)

FOREIGN PATENT DOCUMENTS

| CL | 201900193 | 4/2019 |
|---|---|---|
| CN | 101212459 A | 7/2008 |

(Continued)

OTHER PUBLICATIONS

English Translation Second Chinese Office Action dated May 22, 2020 from Application No. 201680088875.9.
(Continued)

*Primary Examiner* — Timothy J Weidner
(74) *Attorney, Agent, or Firm* — Young Basile Hanlon & MacFarlane, P.C.

(57) ABSTRACT

Methods and apparatuses for wireless communication are provided. The method includes: when a first terminal device and a second terminal device perform wireless communication via a first network device, the first terminal device measures link quality of a first link, the first link is a link between the first terminal device and the first network device; and the first terminal device performs a reporting process for reporting the link quality of the first link according to the link quality of the first link and a first code rate, the first code rate is determined according to a code rate applicable to the first terminal device, or determined according to a code rate applicable to the second terminal device.

16 Claims, 4 Drawing Sheets

(51) Int. Cl.
| | |
|---|---|
| *H04W 8/22* | (2009.01) |
| *H04W 24/10* | (2009.01) |
| *H04W 28/02* | (2009.01) |
| *H04W 28/04* | (2009.01) |
| *H04W 28/06* | (2009.01) |
| *H04W 28/22* | (2009.01) |
| *H04W 72/08* | (2009.01) |
| *H04W 76/20* | (2018.01) |

(52) U.S. Cl.
CPC .......... *H04L 1/0043* (2013.01); *H04L 1/0046* (2013.01); *H04L 1/0075* (2013.01); *H04L 1/20* (2013.01); *H04W 8/22* (2013.01); *H04W 24/10* (2013.01); *H04W 28/0257* (2013.01); *H04W 28/0268* (2013.01); *H04W 28/04* (2013.01); *H04W 28/22* (2013.01); *H04W 72/085* (2013.01); *H04W 76/20* (2018.02)

(58) Field of Classification Search
CPC ..... H04W 8/22–245; H04W 24/02–10; H04W 28/02–065; H04W 28/16–26; H04W 72/02–10; H04W 76/10–38; H04W 80/02–12; H04W 84/005–22; H04W 92/02–24
See application file for complete search history.

(56) References Cited

U.S. PATENT DOCUMENTS

| | | | |
|---|---|---|---|
| 2013/0124945 A1 | 5/2013 | Hu et al. | |
| 2015/0092575 A1* | 4/2015 | Khay-Ibbat | ....... H04W 28/0236 |
| 2016/0073220 A1 | 3/2016 | Wang et al. | |
| 2016/0205575 A1 | 7/2016 | Jung et al. | |
| 2019/0089511 A1* | 3/2019 | Saito | .................... H04W 28/06 |

FOREIGN PATENT DOCUMENTS

| | | |
|---|---|---|
| CN | 101674654 A | 3/2010 |
| CN | 103546234 A | 1/2014 |
| CN | 103731232 A | 4/2014 |
| CN | 105493615 A | 4/2016 |
| JP | 2009533967 A | 9/2009 |
| RU | 2400937 C2 | 9/2010 |
| WO | 2007121163 A1 | 10/2007 |
| WO | 2014058583 A1 | 4/2014 |
| WO | 2018053806 A1 | 3/2018 |

OTHER PUBLICATIONS

English Translation Russian Notice of Allowance dated Nov. 28, 2019 from Application No. 2019111805/07 (022886).
English Translation Indian First Examination Report dated Aug. 7, 2020 from Application No. 201817049O4.
EP Extended Search Report dated Apr. 18, 2019.
English translation of CN OA for CN application No. 201680888875.9 dated Mar. 2, 2020.
English translation of CA OA for CA application No. 3,037,647 dated Apr. 17, 2020.
English translation of CL OA for CL application No. 2019000769 dated Feb. 19, 2020.
Notice of Reasons for Refusal with English Translation for JP Application 2019-500637 dated Sep. 29, 2020.
Brazilian Office Action with English Translation for BR Application BR112019005721-8 dated Sep. 2, 2020.
China Third Office Action with English Translation of CN Application 201680088875.9 dated Aug. 27, 2020.
Communication pursuant to Article 94(3) EPC Examination for EP Application 16916545.3 dated Sep. 1, 2020.
3GPP TSG-RAN2 Meeting #95; Göteborg, Sweden, Aug. 22-26, 2016; R2-164778.
3GPP TSG-RAN WG2 #95; Gothenburg, Sweden Aug. 22-26, 2016; R2-164985.
3GPP TS 26.103; V13.0.0 (Dec. 2015); 3rd Generation Partnership Project; Technical Specification Group Services and System Aspects; Speech codec list for GSM and UMTS (Release 13).
3GPP TS 26.071 V13.0.0 (Dec. 2015); 3rd Generation Partnership Project; Technical Specification Group Services and System Aspects; Mandatory speech CODEC speech processing functions; AMR speech CODEC; General description (Release 13).
Singapore Written Opinion for SG Application 11201902586W dated Nov. 24, 2020.
Canada Second Examiner Report for CA Application 3,037,647 dated Feb. 1, 2021.
IL Office Action for IL Application 265542 dated Nov. 25, 2020.
Indonesia First Office Action with English Translation for ID Application P00201903345 dated Apr. 12, 2021.
Taiwan First Office Action with English Translation for TW Application No. 11020244530 dated Mar. 17, 2021.
Taiwan Office Action with English Translation for TW Application 11020618670 dated Jun. 30, 2021. (6 pages).

* cited by examiner

WIRELESS COMMUNICATION METHOD AND DEVICE

CROSS-REFERENCE TO RELATED APPLICATION(S)

This application is a 371 application of International Application No. PCT/CN2016/099873, filed on Sep. 23, 2016, the entire disclosure of which is hereby incorporated by reference.

TECHNICAL FIELD

Implementations of the disclosure relate to, but are not limited to, the technical field of communication, in particular to methods and apparatuses for wireless communication.

BACKGROUND

At present, there exists a technology of wireless communication, in which a terminal device may encode data (for example, sound data or image data) that needs to be transmitted to a peer end (also referred to as a receiving end), and send the encoded data to the peer end via a network device (for example, an access network device) accessed by the terminal device.

In the above transmission process, in order to ensure reliability and accuracy of transmission, the terminal device may detect link quality of a communication link between the terminal device and the network device, and report the link quality of the communication link to the network device, so that the network device may adjust a code rate used by the terminal device in a process of data encoding according to the link quality of the communication link.

However, in the above technology, due to a limitation of encoding and decoding capability (for example, an applicable code rate), there may be cases where the terminal device or the peer end cannot support the code rate adjusted by the network device, that is, the process of reporting the link quality of the communication link and the process of adjustment by the network device fail to obtain desired effects, which results in a waste of communication resources used in the process of reporting the link quality of the communication link and waste of processing resources of the terminal device and the network device.

SUMMARY

Implementations of the present disclosure provide methods and apparatuses for wireless communication.

In a first aspect, a method for wireless communication is provided, the method comprising: when a first terminal device and a second terminal device perform wireless communication via a first network device, measuring, by the first terminal device, link quality of a first link, wherein the first link is a link between the first terminal device and the first network device; and performing, by the first terminal device, a reporting process for reporting the link quality of the first link according to the link quality of the first link and a first code rate, wherein the first code rate is determined according to a code rate applicable to the first terminal device, or determined according to a code rate applicable to the second terminal device.

With reference to the first aspect, in a first implementation manner of the first aspect, the first code rate is a smaller one of a maximum code rate applicable to the first terminal device and a maximum code rate applicable to the second terminal device, or an intersection of a set of code rates applicable to the first terminal device and a set of code rates applicable to the second terminal device, or the maximum code rate applicable to the first terminal device, or the set of code rates applicable to the first terminal device, or the maximum code rate applicable to the second terminal device, or the set of code rates applicable to the second terminal device.

With reference to the first aspect and the foregoing implementation manner, in a second implementation manner of the first aspect, performing, by the first terminal device, the reporting process for reporting the link quality of the first link according to the link quality of the first link and the first code rate comprises: performing, by the first terminal device, the reporting process for reporting the link quality of the first link according to a first relationship and a second relationship, wherein the first relationship is a relationship between the link quality of the first link and a predetermined first threshold of quality, the second relationship is a relationship between the first code rate and a recommended code rate, and the recommended code rate is a code rate that, before a current time, the first network device most recently indicates to be used by the first terminal device.

With reference to the first aspect and the foregoing implementation manners, in a third implementation manner of the first aspect, performing, by the first terminal device, the reporting process for reporting the link quality of the first link according to the first relationship and the second relationship comprises: when the first relationship is that the link quality of the first link is greater than or equal to the first threshold of quality and the second relationship is that the first code rate is less than the recommended code rate, not reporting, by the first terminal device, the link quality of the first link to the first network device; or when the first relationship is that the link quality of the first link is greater than or equal to the first threshold of quality and the second relationship is that the first code rate is greater than or equal to the recommended code rate, reporting, by the first terminal device, the link quality of the first link to the first network device.

With reference to the first aspect and the foregoing implementation manners, in a fourth implementation manner of the first aspect, the method further comprises: receiving, by the first terminal device, indication information of the first threshold of quality that is sent by the first network device.

With reference to the first aspect and the foregoing implementation manners, in a fifth implementation manner of the first aspect, the first threshold of quality is determined according to the recommended code rate.

With reference to the first aspect and the foregoing implementation manners, in a sixth implementation manner of the first aspect, performing, by the first terminal device, the reporting process for reporting the link quality of the first link according to the link quality of the first link and the first code rate comprises: performing, by the first terminal device, the reporting process of the link quality of the first link according to a third relationship and a fourth relationship, wherein the third relationship is a relationship between the link quality of the first link and a predetermined second threshold of quality, the fourth relationship is a relationship between the link quality of the first link and a reference quality, and the reference quality is determined according to the first code rate.

With reference to the first aspect and the foregoing implementation manners, in a seventh implementation manner of the first aspect, performing, by the first terminal device, the reporting process for reporting the link quality of the first link according to the third relationship and the fourth relationship comprises: when the third relationship is that the link quality of the first link is less than or equal to the second threshold of quality and the fourth relationship is that the link quality of the first link is greater than or equal to a first reference quality, not reporting, by the first terminal device, the link quality of the first link to the first network device; or when the third relationship is that the link quality of the first link is less than or equal to the second threshold of quality and the fourth relationship is that the link quality of the first link is less than a second reference quality, reporting, by the first terminal device, the link quality of the first link to the first network device.

With reference to the first aspect and the foregoing implementation manners, in an eighth implementation manner of the first aspect, the method further comprises: receiving, by the first terminal device, indication information of the second threshold of quality and indication information of the reference quality that are sent by the first network device.

With reference to the first aspect and the foregoing implementation manners, in a ninth implementation manner of the first aspect, the second threshold of quality is determined according to the recommended code rate.

With reference to the first aspect and the foregoing implementation manners, in a tenth implementation manner of the first aspect, the method further comprising: sending, by the first terminal device, indication information of the first code rate to the first network device.

In a second aspect, a method for wireless communication is provided, the method comprising: when a first terminal device and a second terminal device perform wireless communication via a first network device, measuring, by the first terminal device, link quality of a first link, wherein the first link is a link between the first terminal device and the first network device; and sending, by the first terminal device, indication information of the link quality of the first link and indication information of a first code rate to the first network device, wherein the first code rate is determined according to a code rate applicable to the first terminal device, or determined according to a code rate applicable to the second terminal device.

With reference to the second aspect, in a first implementation manner of the second aspect, the first code rate is: a smaller one of a maximum code rate applicable to the first terminal device and a maximum code rate applicable to the second terminal device, or an intersection of a set of code rates applicable to the first terminal device and a set of code rates applicable to the second terminal device, or the maximum code rate applicable to the first terminal device, or the set of code rates applicable to the first terminal device, or the maximum code rate applicable to the second terminal device, or the set of code rates applicable to the second terminal device.

With reference to the second aspect and the foregoing implementation manners, in a second implementation manner of the second aspect, sending, by the first terminal device, indication information of the link quality of the first link and indication information of the first code rate to the first network device comprises: after the first terminal device determines that the link quality of the first link is greater than or equal to a predetermined first threshold of quality, sending, by the first terminal device, the indication information of the link quality of the first link and the indication information of the first code rate to the first network device.

With reference to the second aspect and the foregoing implementation manners, in a third implementation manner of the second aspect, the method further comprises: receiving, by the first terminal device, indication information of the first threshold of quality that is sent by the first network device.

With reference to the second aspect and the foregoing implementation manners, in a fourth implementation manner of the second aspect, the first threshold of quality is determined according to the recommended code rate.

With reference to the second aspect and the foregoing implementation manners, in a fifth implementation manner of the second aspect, sending, by the first terminal device, indication information of the link quality of the first link and indication information of the first code rate to the first network device comprises: after the first terminal device determines that the link quality of the first link is less than or equal to a predetermined second threshold of quality, sending, by the first terminal device, the indication information of the link quality of the first link and the indication information of the first code rate to the first network device.

With reference to the second aspect and the foregoing implementation manners, in a sixth implementation manner of the second aspect, the method further comprises: receiving, by the first terminal device, indication information of the second threshold of quality that is sent by the first network device.

With reference to the second aspect and the foregoing implementation manners, in a seventh implementation manner of the second aspect, the second threshold of quality is determined according to the recommended code rate.

In a third aspect, a method for wireless communication is provided, the method comprising: when a first terminal device and a second terminal device perform wireless communication via a first network device, receiving, by the first network device, indication information of link quality of a first link and indication information of a first code rate that are sent by the first terminal device, wherein the first link is a link between the first terminal device and the first network device, and the first code rate is determined according to a code rate applicable to the first terminal device, or determined according to a code rate applicable to the second terminal device; determining, by the first network device, a target code rate according to the link quality of the first link; and performing, by the first network device, an adjustment process of a code rate currently used by the first terminal device according to a relationship between the target code rate and the first code rate.

With reference to the third aspect, in a first implementation manner of the third aspect, the first code rate is: a smaller one out of a maximum code rate applicable to the first terminal device and a maximum code rate applicable to the second terminal device, or an intersection of a set of code rates applicable to the first terminal device and a set of code rates applicable to the second terminal device, or the maximum code rate applicable to the first terminal device, or the set of code rates applicable to the first terminal device, or the maximum code rate applicable to the second terminal device, or the set of code rates applicable to the second terminal device.

With reference to the third aspect and the foregoing implementation manners, in a second implementation manner of the third aspect, performing, by the first network device, an adjustment process of a code rate currently used by the first terminal device according to a relationship between the target code rate and the first code rate comprises: when the first code rate is less than or equal to the target code rate, not adjusting, by the first network device, the code rate currently used by the first terminal device.

With reference to the third aspect and the foregoing implementation manners, in a third implementation manner of the third aspect, performing, by the first network device, the adjustment process of the code rate currently used by the first terminal device according to the relationship between the target code rate and the first code rate comprises: when the first code rate is greater than the target code rate, adjusting, by the first network device, the code rate currently used by the first terminal device to the target code rate.

In a fourth aspect, an apparatus for wireless communication is provided, comprising units for performing the acts of the method of wireless communication in the first aspect and various implementation manners of the first aspect.

In a fifth aspect, an apparatus for wireless communication is provided, comprising units for performing the acts of the method of wireless communication in the second aspect and various implementation manners of the second aspect.

In a sixth aspect, an apparatus for wireless communication is provided, comprising units for performing the acts of the method of wireless communication in the third aspect and various implementation manners of and the third aspect.

In a seventh aspect, a device for wireless communication is provided, comprising a memory and a processor, and the memory is configured to store a computer program, and the processor is configured to call and run the computer program from the memory, so that a first terminal device performs any one method of wireless communication of the first aspect and its various implementation manners.

In an eighth aspect, a device for wireless communication is provided, comprising a memory and a processor, and the memory is configured to store a computer program, and the processor is configured to call and run the computer program from the memory, so that a first terminal device performs any one method of wireless communication of the second aspect and its various implementation manners.

A ninth aspect, a device for wireless communication is provided, comprising a memory and a processor, and the memory is configured to store a computer program, and the processor is configured to call and run the computer program from the memory, so that a first network device performs any one method of wireless communication of the third aspect and its various implementation manners.

In a tenth aspect, a computer program product is provided, the computer program product comprises: computer program codes, and when the computer program codes are run by a processing unit and a sending unit, or a processor and a transmitter of a terminal device, the terminal device performs any one method of wireless communication of the first aspect and its various implementation manners.

In an eleventh aspect, a computer program product is provided, the computer program product comprises: computer program codes, and when the computer program codes are run by a receiving unit and a processing unit, or a receiver and a processor of a terminal device, the terminal device performs any one method of wireless communication of the second aspect and its various implementation manners.

In a twelfth aspect, a computer program product is provided, the computer program product comprises: computer program codes, and when the computer program codes are run by a receiving unit and a processing unit, or a receiver and a processor of a network device, the network device performs any one method of wireless communication of the third aspect and its various implementation manners.

In a thirteenth aspect, a computer-readable storage medium is provided, and the computer-readable storage medium stores a program, and the program causes a terminal device to perform any one method of wireless communication of the first aspect and its various implementation manners.

In a fourteenth aspect, a computer-readable storage medium is provided, and the computer-readable storage medium stores a program, and the program causes a terminal device to perform any one method of wireless communication of the second aspect and its various implementation manners.

In a fifteenth aspect, a computer-readable storage medium is provided, and the computer-readable storage medium stores a program, and the program causes a network device to perform any one method of wireless communication of the third aspect and its various implementation manners.

BRIEF DESCRIPTION OF DRAWINGS

In order to more clearly illustrate technical solutions of implementations of the present disclosure, drawings used in the implementations of the present disclosure will be briefly described below. It is apparent that the drawings described below are only some implementations of the present disclosure, and those skilled in the art may also obtain other drawings according to these drawings without paying an inventive effort.

DETAILED DESCRIPTION

Figure 1:
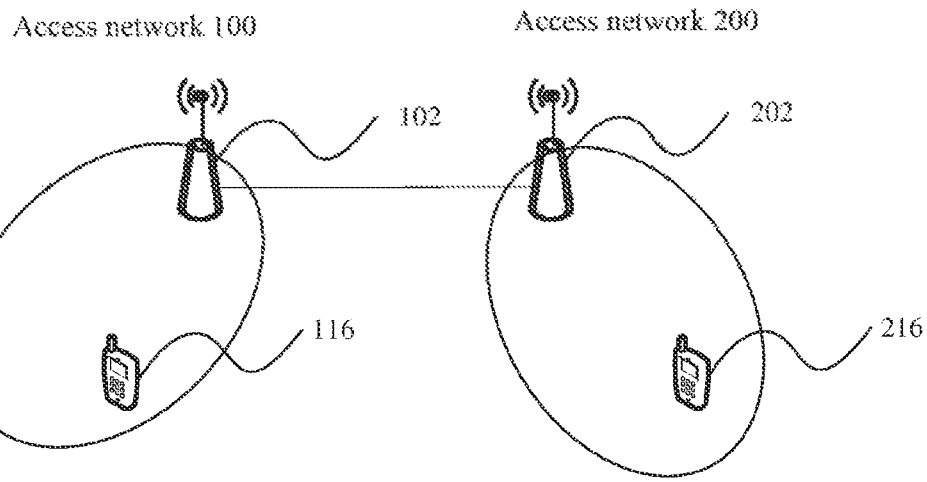
FIG. 1 is a schematic diagram of architecture of an example of a communication system according to an implementation of the present disclosure.

The technical solutions in the implementations of the present disclosure are clearly and completely described in following with reference to the drawings in the implementations of the present disclosure. It is apparent that the implementations described below are only part, but not all, of the implementations of the present disclosure. All other implementations obtained by those skilled in the art based on the implementations of the present disclosure without paying an inventive effort are within the scope of the present disclosure.

The terms "component", "module", "system", and the like, as used in the specification, are used to represent a computer-related entity, hardware, firmware, a combination of hardware and software, software, or software in execution. For example, a component may be, but is not limited to, a process running in a processor, a processor, an object, an executable file, a thread of execution, a program, and/or a computer. By way of illustration, both an application running in a computing device and a computing device may be components. One or more components may reside in a process and/or an execution thread, and the components may be located on one computer and/or distributed among two or more computers. Moreover, these components may be executed from various computer-readable media having various data structures stored thereon. A component may, for example, communicate through local and/or remote processes according to signals having one or more data packets (e.g., data from two components interacting with a local system, a distributed system, and/or another component between a network, such as the Internet interacting with other systems via signals).

The solutions of the implementations of the present disclosure may be applied to existing cellular communication systems, such as Global System for Mobile Communication (GSM), Code Division Multiple Access (CDMA), Wideband Code Division Multiple Access (WCDMA), General Packet Radio Service (GPRS), Universal Mobile Telecommunications System (UMTS), Long Term Evolution (LTE), and especially applied to a LTE evolution system of 4.5G and a wireless communication system of 5G. The applicable communications are primarily for voice and data communications. In general, a traditional base station has a limited number of connections and is easy to be implemented.

A next-generation mobile communication system will not only support traditional communication, but also support M2M (Machine to Machine) communication, or MTC (Machine Type Communication) communication. According to a forecast, by 2020, the number of MTC devices connected to a network will reach 50 to 100 billion, which will far exceed the current number of connections. For a M2M-type service, due to its wide variety in service types, there are great differences in network requirements. In general, there are several requirements: reliable transmission, but not sensitive to time delay; and low latency, high reliability transmission.

For services requiring reliable transmission but not sensitive to time delay, it is easier to process. However, for services requiring low-latency, and high-reliability transmission, not only time delay of the transmission is required to be short, but also the transmission is required to be reliable, such as services of V2V (Vehicle to Vehicle). If the transmission is unreliable, it will cause retransmission and the time delay of the transmission will be too large to meet requirements.

Due to existence of a large number of connections, there is a great difference between wireless communication systems in future and existing communication systems. A large number of connections require more resources to access terminal devices and need to consume more resources for transmissions of scheduling signaling related to data transmission of the terminal devices. The solutions according to the implementations of the present disclosure may effectively solve the above problem of resources consumption.

Optionally, the network device is a base station, and the terminal device is user equipment.

The present disclosure describes various implementations in connection with terminal devices (e.g., a first terminal device and a second terminal device). A terminal device may also be called a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal device may be a station (STAION, ST) in a Wireless Local Area Networks (WLAN), or may be a cellular phone, a cordless phone, a Session Initiation Protocol (SIP) phone, or a wireless local loop (WLL) station, a Personal Digital Assistant (PDA) device, a handheld device with capability of wireless communication, a computing device or other processing device connected to a wireless modem, an in-vehicle device, a wearable device, a terminal device in a future 5G network, or a terminal device in a future evolved PLMN network, etc.

Moreover, the present disclosure describes various implementations in connection with a network device (e.g., a first network device). The network device may be a network device for communicating with the mobile device, or may be an access point (ACCESS POINT, AP) in the WLAN, or a Base Transceiver Station (BTS) in GSM or Code Division Multiple Access (CDMA), or may be a NodeB (NB) in WCDMA, or an Evolutional Node B (eNB or eNodeB) in Long Term Evolution (LTE), or a relay station or an access point, or an in-vehicle device, a wearable device, a network device in the future 5G network, or a network device in the future evolved PLMN network.

In addition, in the implementations of the present disclosure, the network device (for example, the base station) may be a macro base station, or may be a base station for providing a small cell, wherein small cells may comprise: a Metro cell, a Micro cell, a Pico cell, and a Femto cell, etc. The small cells have characteristics of small coverage and low transmission power, and they are suitable for providing high-speed data transmission services.

The method and apparatus for wireless communication provided by the implementations of the present disclosure may be applied to a terminal device or a network device, wherein the terminal device or the network device comprises a hardware layer, an operating system layer running on the hardware layer, and an application layer running on the operating system layer. The hardware layer comprises hardware such as a central processing unit (CPU), a memory management unit (MMU), and a memory (also known as main storage). The operating system may be any one or more computer operating systems that implement services processing through processes, such as a Linux™ operating system, a Unix™ operating system, an Android™ operating system, an iOS™ operating system, or a Windows™ operating system. The application layer comprises applications such as browsers, contacts, word processing software, or instant messaging software. Further, in the implementations of the present disclosure, a specific structure of an execution subject of the method for wireless communication is not particularly restricted, as long as it is possible to communicate by the method for wireless communication according to an implementation of the present disclosure by running a program that records the codes of the method for wireless communication of the implementation of the present disclosure. For example, the execution subject of the method for wireless communication according to the implementation of the present disclosure may be the terminal device or the network device, or may be a functional module capable of calling and executing the program in the terminal device or the network device.

Furthermore, various aspects or features of the present disclosure may be implemented as a method, an apparatus, or an article of manufacture using standard programming and/or engineering techniques. The term "article of manufacture" used in the disclosure encompasses a computer program accessible from any computer-readable device, carrier, or medium. For example, the computer-readable medium may include, but not limited to, a magnetic storage device (such as a hard disk, a floppy disk, or a magnetic tape), a disk (such as a compact disc (CD), a digital versatile disc (Digital Versatile Disc, DVD)), smart cards and flash storage devices (such as Erasable Programmable Read-Only Storage (EPROM), cards, sticks or key drives). Additionally, various storage media described herein may represent one or more devices and/or other machine-readable media for storing information. The term "machine-readable medium" may include, but not limited to, a radio channel and various other mediums capable of storing, containing, and/or carrying instructions and/or data.

FIG. 1 is a schematic diagram showing an example of a communication system using the present disclosure. As shown in FIG. 1, in an implementation of the present disclosure, the communication system comprises an access network 100 and an access network 200, wherein the access network 100 comprises a network device 102 and at least one terminal device 116, and the access network 200 comprises a network device 202 and at least one terminal device 216, wherein the network device 102 and the network device 202 may be communicatively connected by a transmission medium such as an optical fiber, and thereby the terminal device 116 may send data to the network device 102 through radio resources (such as time domain resources, frequency domain resources, airspace resources, or code domain resources) provided by the access network 100 when the terminal device 116 needs to communicate with the terminal device 216, and the network device 102 may send the data to the network device 202 through a communication connection with the network device 202, and thus, the network device 202 may transmit data to the terminal device 216 through radio resources provided by the access network 200.

It should be understood that the structure of the communication system shown in FIG. 1 is merely an exemplary illustration, and the present disclosure is not limited thereto. For example, the communication system may further include, for example, a core network device and a gateway device, and the like, and the number of access networks and the number of network devices and terminal devices in each access network included in the communication system may be arbitrarily changed as needed, and they are not particularly restricted in the present disclosure.

In the implementation of the present disclosure, the communication system may be a Public Land Mobile Network (PLMN) or a D2D network or a M2M network or other network. FIG. 1 is only an example of a simplified schematic diagram, and the network may include other network devices, which are not shown in FIG. 1.

The specific structure of the access network is described in detail below with reference to FIG. 2, wherein a communication mode between the network device 102 and the terminal device 116 is similar to that between the network device 202 and the terminal device 216. Here, in order to avoid redundancy, taking the communication mode between the network device 102 and the terminal device 116 as an example, the structure and working mode of the access network are described in detail.

Figure 2:
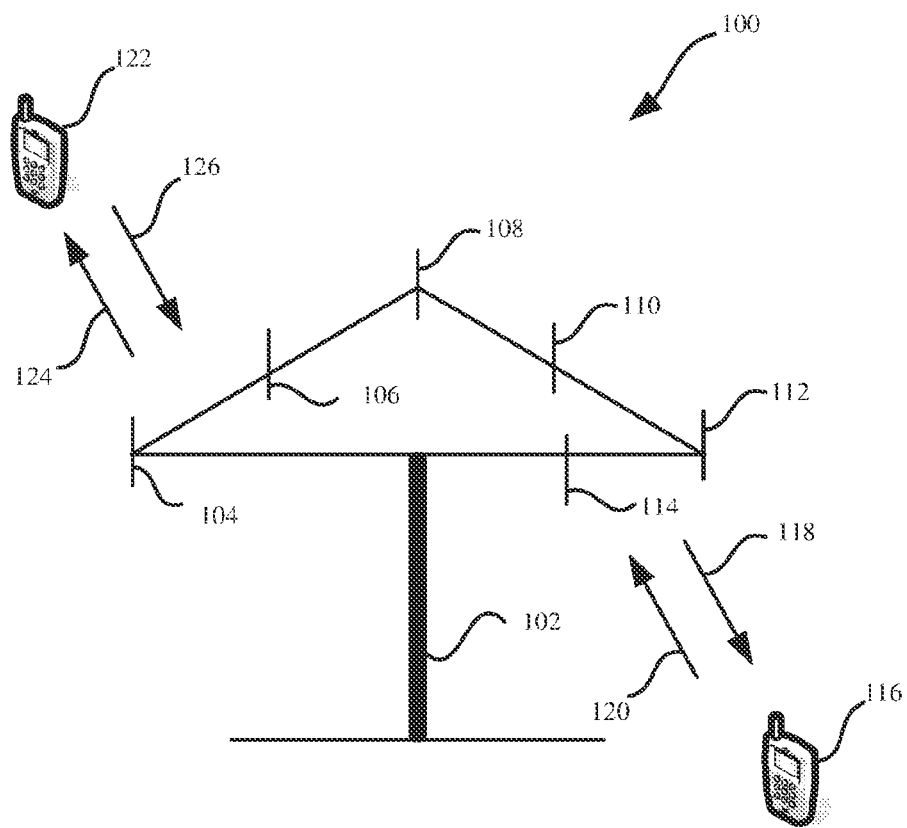
FIG. 2 is a schematic diagram of architecture of another example of a communication system according to an implementation of the present disclosure.

As shown in FIG. 2, the access network 100 comprises a network device 102 and at least one terminal device 116. Network device 102 may include multiple antennas such as antennas 104, 106, 108, 110, 112, and 114. In addition, the network device 102 may additionally include a chain of transmitter and a chain of receiver, as will be understood by those of ordinary skill in the art, and the chains may both include multiple components related to signal transmission and reception (such as a processor, a modulator, a multiplexer, a demodulator, a de-multiplexer, or an antenna).

The network device 102 may communicate with a plurality of terminal devices (such as the terminal device 116 and the terminal device 122). However, it will be understood that the network device 102 may communicate with any number of terminal devices similar to the terminal device 116 or 122. The terminal devices 116 and 122 may be, for example, cellular telephones, smart phones, portable computers, handheld communication devices, handheld computing devices, satellite radio apparatus, global positioning systems, PDAs, and/or any other devices suitable for communicating over the wireless communication system.

As shown in FIG. 2, the terminal device 116 is in communication with antennas 112 and 114, wherein the antennas 112 and 114 transmit information to the terminal device 116 over a forward link 118 and receive information from the terminal device 116 over a reverse link 120. In addition, the terminal device 122 is in communication with the antennas 104 and 106, wherein the antennas 104 and 106 transmit information to the terminal device 122 over a forward link 124 and receive information from the terminal device 122 over a reverse link 126.

For example, in a Frequency Division Duplex (FDD) system, forward link 118 may use a different frequency band from that used by reverse link 120, and forward link 124 may use a different frequency band from that used by reverse link 126.

As another example, in a Time Division Duplex (TDD) system and a Full Duplex system, the forward link 118 and the reverse link 120 may use a common frequency band, and the forward link 124 and the reverse link 126 may use a common frequency band.

Each antenna (or a group of antennas composed of multiple antennas) and/or area designed for communication is referred to as a sector of network device 102. For example, a group of antennas may be designed to communicate with terminal devices in a sector of coverage area of the network device 102. In a process in which network device 102 communicates with terminal devices 116 and 122 via forward links 118 and 124 respectively, transmitting antennas of network device 102 may utilize beam forming to improve signal to noise ratios of forward links 118 and 124. Furthermore, in contrast to the manner in which the network device transmits signals to all of its terminal devices through a single antenna, when the network device 102 utilizes beam forming to transmit signals to randomly dispersed terminal devices 116 and 122 in associated coverage area, mobile devices in neighboring cells are subject to less interference.

At a given time, network device 102, terminal device 116, or terminal device 122 may be a wireless communication transmitting apparatus and/or a wireless communication receiving apparatus. When transmitting data, the wireless communication transmitting apparatus may encode data for transmission. In particular, the wireless communication transmitting apparatus may acquire (e.g., generate, receive from other communication apparatuses, or store in storage)

a number of data bits to be transmitted over a channel to the wireless communication receiving apparatus. Such data bits may be contained in a transport block (or multiple transport blocks) of data that may be segmented to produce multiple code blocks.

Optionally, when a first terminal device performs wireless communication with a second terminal device, the data transmitted is sound data or image data.

Specifically, by way of an example and not a limitation, the method of wireless communication of the implementations of the present disclosure may be applied to, for example, a scenario of transmitting sound data based on a technology such as VoIP (Voice over Internet Protocol) or VoLTE (Voice over LTE).

VoIP, in short, means digitizing analog signals and transmitting them in real time over an Internet Protocol (IP) network in a form of data packets. The biggest advantage of VoIP is that it may widely use the environment of interconnection of Internet and global IP to provide more and better services than traditional services. VoIP may cheaply transmit services of voice, fax, video, data and other services over IP networks, such as unified messaging services, virtual phones, virtual voice/fax mailboxes, directory services, Internet call centers, Internet call management, and teleconferencing, E-commerce, storing and forwarding of fax, storing and forwarding of various information etc.

VoLTE carries voice services based on an IP Multimedia Subsystem (IMS) network, and it may realize a unification of data and voice services under the same network. In other words, under the 4G network, not only high-speed data services may be provided, but also high-quality audio and video calls may be provided, and high-quality audio and video calls require the technology of VoLTE.

Based on new networks and new requirements, whether for saving transmission frequency-band resources or for maintaining high efficiency of line communication, it is of great significance to research systems using various variable-rate speech coding technologies. At present, in order to meet the requirements, a concept of Adaptive Multi-rate (AMR), that is, an adaptive multi-rate speech coder, is proposed. It is mainly applied to audio of mobile devices, and a compression ratio is relatively large, but compared with other compression formats, the quality is relatively poor, because it is mostly used in voice calls. AMR is categorized as two types, one is adaptive multi-rate narrowband coding (AMR-NarrowBand, AMR-NB), a voice bandwidth range is 300-3700 Hz, and a sampling frequency is 8 KHz; and the other is adaptive multi-rate wideband coding (AMR-WideBand, AMR-WB), the voice bandwidth range is 50-7000 Hz and the sampling frequency is 16 KHz. But considering a short-term correlation of speech, each frame is 20 ms in length. These two encoders use different rates according to requirements of bandwidth, but they have similarities.

In AMR-NB, the sampling frequency of AMR is 8 KHz, one frame is encoded every 20 ms, and each frame contains 160 speech samples.

AMR uses a coding mode based on algebraic code excited linear prediction (ACELP). An encoder extracts ACELP model parameters (linear prediction coefficients, indexes and gains of adaptive codebook and fixed codebook), and a decoder receives data and then resynthesizes speech according to these parameters.

As for the implementation of AMR-NB in TD-SCDMA, an encoder uses an algebraic codebook linear prediction (ACELP) hybrid coding mode, in which digital speech signals comprises both a number of speech feature parameters and partial waveform coding information, and then speech signals are resynthesized by using the feature information.

The extraction number of the parameters is controlled, and the following eight rates are obtained by selecting information according to a requirement for rate, and mixed to form an adaptive speech coder as shown in Table (a) below. For example, 244 bits of parameter information are extracted in the mode AMR 12.20, and only 95 bits of information are extracted in the mode AMR 4.70. According to the amount of information contained in these bits, these bits may be categorized as three types: classes 0, 1, and 2. In channel coding, classes 0 and 1 will use cyclic redundancy check code for error checking, and class 2 will be restored according to a previous frame.

TABLE (a)

| Coding model | Bit rate of encoder |
| --- | --- |
| AMR_12.2 | 12.20 kbit/s (GSM_EFR) |
| AMR_10.2 | 10.20 kbit/s |
| AMR_7.95 | 7.95 kbit/s |
| AMR_7.40 | 7.40 kbit/s (IS-641) |
| AMR_6.70 | 6.70 kbit/s (PDC-EFR) |
| AMR_5.90 | 5.90 kbit/s |
| AMR_5.15 | 5.15 kbit/s |
| AMR_4.75 | 4.75 kbit/s |
| AMR_SID (Low rate background noise coding mode) | 1.80 kbit/s (No voice transmission) |

The sampling frequency in the AMR-WB is 16 kHz, which is a wideband speech coding standard adopted by the international standardization organizations ITU-T and 3GPP, also known as the G722.2 standard. Moreover, in AMR-WB, nine different coding modes (or coding models) are supported, and bit rates of encoder corresponding to the nine coding modes are: 6.6 kb/s, 8.85 kb/s, 12.65 kb/s, 14.25 kb/s, 15.85 kb/s, 18.25 kb/s, 19.85 kb/s, 23.05 kb/s, and 23.85 kb/s. The voice bandwidth range provided reaches 50 to 7000 Hz, vocal sounds are more natural, comfortable and easier to distinguish than before.

That is, in implementations of the present disclosure, a code rate (for example, comprising a first code rate) may refer to a bit rate (or rate in bits) of an encoder. The bit rate refers to the number of bits transmitted per second, and the unit is bps (Bit Per Second). The higher the bit rate is, the larger size of data is transmitted. The bit rate indicates how many bits are required per second to represent the encoded/compressed audio and video data.

As an example and not a limitation, in implementations of the present disclosure, the bit rate and the audio and video compression may have the following relationship: the higher the bit rate, the better the quality of the audio and video, but the larger the encoded file; and the lower the bit rate, the lower the quality of the audio and video, but the smaller the encoded file.

In some implementation manners, the code rate is a code rate used when an application layer encodes or decodes audio and video data, or the code rate is a bit rate used when an access layer transmits audio and video data.

A specific process of wireless communication in an implementation of the present disclosure is described in detail below with reference to FIG. 3 and FIG. 4.

Figure 3:
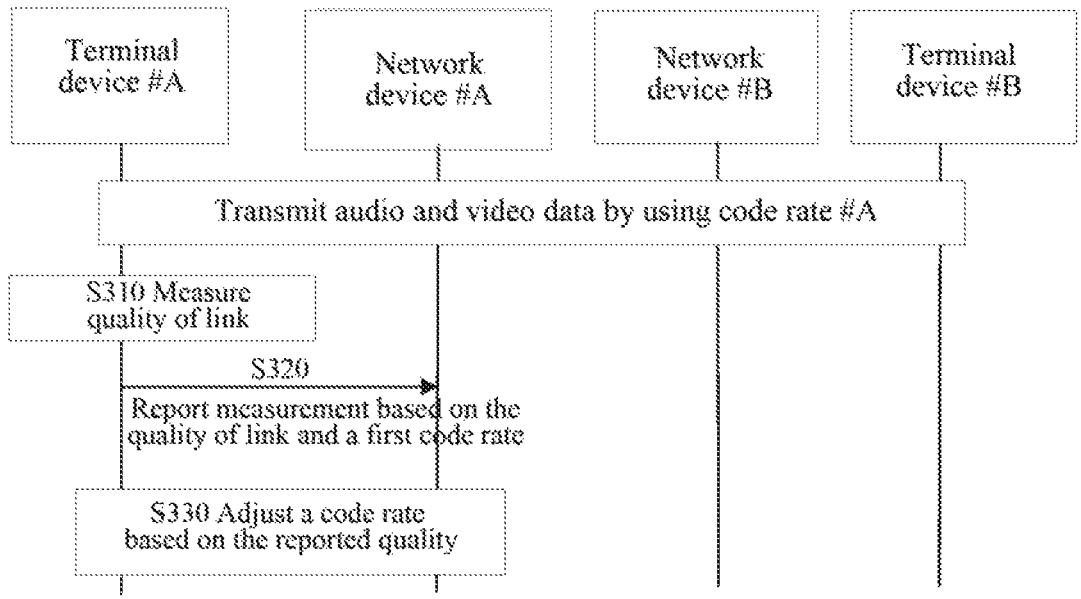
FIG. 3 is a schematic diagram of interactions of an example of a method for wireless communication according to an implementation of the present disclosure.

FIG. 3 is a schematic diagram of interactions in an example of a method 300 for wireless communication in accordance with an implementation of the present disclosure.

As shown in FIG. 3, when a terminal device #A (that is, an example of a first terminal device) performs wireless communication (for example, transmission of voice data) with a terminal device #B (that is, a second terminal device). The terminal device #A may encode data to be transmitted by using a code rate #A (or may be referred to as compression processing), and send the obtained data to a network device #A accessed by the terminal device #A, and the network device #A transmits the data to a network device #B accessed by the terminal device #B, and the network device #B may transmit the data to the terminal device #B.

The code rate #A may be a code rate specified by a system, or may be a code rate indicated by the network device #A through signalling to the terminal device #A, or the code rate A may be a code rate determined by an negotiation between the terminal device #A and the terminal device #B (such as, via the network device #A and the network device #B).

In the implementation of the present disclosure, one or more code rates applicable to the terminal device #A (for example, one or more code rates that the terminal device #A may support, or one or more code rates specified by the network device to be used by the terminal device #A) are called a set of code rate #A, and one or more code rates applicable to the terminal device #B (for example, one or more code rates that the terminal device #B may support, or one or more code rates specified by the network device to be used by the terminal device #B) are called a set of code rate #B, and the code rate #A may belong to the set of code rate #A, and the code rate #A may belong to the set of code rate #B.

That is, both the terminal device #A and the terminal device #B may support the code rate #A, thereby ensuring that the terminal device #A may complete encoding of data based on the code rate #A, and ensuring that the terminal device #B may complete encoding of data based on the code rate #A.

In the implementation of the present disclosure, the quality of a link #A (that is, an example of a first link) between the terminal device #A and the network device #A may be dynamically changed. Therefore, in the implementation of the present disclosure, a reporting mechanism of the link quality may be introduced, that is, the terminal device #A may, for example, periodically detect the quality of the link #A and report it to the network device #A, and thereby the network device #A may adjust the code rate #A based on the quality of the link #A, and the adjusted code rate may ensure accuracy of the communication under the quality of the link #A reported by the terminal device #A.

The reporting mechanism of the link quality in the implementation of the present disclosure is described in detail below.

In the implementation of the present disclosure, when the terminal device #A determines whether to report the link quality, two parameters, that is, the quality of the link #A and a code rate #B (that is, an example of a first code rate) may be used.

The code rate #B may be one or more, and it is not particularly limited in the present disclosure.

Optionally, the first code rate is a smaller one of a maximum code rate applicable to the first terminal device and a maximum code rate applicable to the second terminal device, or the first code rate is an intersection of a set of code rates applicable to the first terminal device and a set of code rates applicable to the second terminal device, or the first code rate is a maximum code rate applicable to the first terminal device, or the first code rate is a set of code rates applicable to the first terminal device, or the first code rate is a maximum code rate applicable to the second terminal device, or the first code rate is a set of code rates applicable to the second terminal device.

Specifically, the code rate #B may be determined according to one or more code rates (for example, the above set of code rate #A) applicable to the terminal device #A (for example, one or more code rates that the terminal device #A may support, or one or more code rates specified by the network device to be used by the terminal device #A), for example, the code rate #B may be part or all of the code rates in the set of code rate #A. And in this case, as an example but not limitation, a higher layer (such as an application layer or an IMS layer) may indicate the set of code rate #A for the terminal device #A.

Optionally, the code rate #B may be determined according to one or more code rates (for example, the above set of code rate #B) applicable to the terminal device #B (for example, one or more code rates that the terminal device #B may support, or one or more code rates specified by the network device to be used by the terminal device #B), for example, the code rate #B may be part or all of the code rates in the set of code rate #B.

In this case, for example, the terminal device #B may transmit indication information of the set of code rate #B to the terminal device #A via the network device #B and the network device A. For example, the set of code rate #B may be obtained by an operator, or a network administrator, and indication information of the set of code rate #B may be sent to the terminal device #A, then the terminal device #A acquires the set of code rate #B. Optionally, a higher layer (such as an application layer or an IMS layer) may indicate the set of code rate #B to the terminal device #A.

Optionally, the code rate #B may be determined according to the set of code rate #A and the set of code rate #B. For example, the code rate #B may be a code rate belonging to both the set of code rate #A and the set of code rate #B.

Optionally, the terminal device #A may use the maximum code rate of the intersection of the set of code rate #A and the set of code rate #B as the code rate #B.

Optionally, the terminal device #A may use part or all of the code rates in the intersection of the set of code rate #A and the set of code rate #B as the code rate #B.

As an example but not limitation, the above code rate #B is determined by an encoding and decoding set recommended by a higher level (such as an application layer or IMS layer) and/or an encoding and decoding set recommended by an access layer. The encoding and decoding set suggested by the higher layer (such as the application layer or the IMS layer) may further include a encoding and decoding set that can be used by the peer terminal for communication.

In the implementation of the present disclosure, the terminal device #A may directly use the code rate #B as a determination parameter to be compared, as an example but not limitation, in this case, compared objects may be the code rate #B and a recommended code rate, that is, mode 1, and a specific processing procedure of the mode 1 will be described in detail below.

Optionally, the terminal device #A may also determine a reference quality range corresponding to the code rate #B based on the code rate #B, and use the reference quality range as a determination parameter to be compared, as an example but not limitation, in this case, the compared objects may be the quality of the link #A and the reference quality range, that is, mode 2, and a specific processing procedure of the mode 2 will be described in detail below.

In the implementation of the present disclosure, the reference quality range may be a range of qualities to which the code rate #B may be applied, provided that reliability and accuracy of the communication are satisfied.

Hereinafter, for ease of understanding and explanation, the maximum value in the reference quality range is referred to as reference quality ThmaxA (that is, an example of a first reference quality), and the minimum value in the reference quality range is referred to as reference quality ThmaxB (that is, an example of a second reference quality).

It needs to be explained that there may be multiple values in the reference quality range, in which case the reference quality ThmaxA and the reference quality ThmaxB are different; or, there may be one value in the reference quality range, in which case the reference quality ThmaxA and the reference quality ThmaxB are the same, and it is not particularly limited in the present disclosure.

Thus, at S310, the terminal device #A may measure the quality of the link #A. It needs to be explained that the method and the process that the terminal device #A measures the quality of the link #A may be similar to those in the prior art. Here, in order to avoid redundancy, detailed description thereof is omitted.

At S320, the terminal device #A may determine a reporting policy for reporting the quality of the link #A according to the quality of the link #A and the code rate #B, that is, whether the quality of the link #A is reported.

Mode 1

Optionally, performing, by the first terminal device, a reporting process of the link quality of the first link according to the link quality of the first link and the first code rate comprises: the first terminal device performs the reporting process of the link quality of the first link according to a first relationship and a second relationship, wherein the first relationship comprises a relationship between the link quality of the first link and a predetermined first threshold of quality, the second relationship comprises a relationship between the first code rate and a recommended code rate, and the recommended code rate is a code rate that, before a current time, the first network device most recently indicates to be used by the first terminal device.

Specifically, as an example but not limitation, in the implementation of the present disclosure, the terminal device #A may determine the reporting policy based on a comparison result (i.e., an example of the first relationship) of the quality of the link #A and a predetermined quality threshold range (such as, the first threshold of quality and a second threshold of quality), and a comparison result of the code rate #B and the recommended code rate (i.e., an example of the second relationship).

The recommended code rate is a code rate that the network device A most recently (i.e., the last one before the current time) indicates to be used by the terminal device #A during the communication between the terminal device #A and the terminal device #B.

It should be understood that the recommended code rate may be the code rate currently used by the terminal device #A (for example, the above code rate #A), or may not be the code rate currently used by the terminal device #A, and it is not particularly limited in the present disclosure.

In the implementation of the present disclosure, the quality range may be a range of quality to which the currently used code rate (for example, the code rate #A) may be applied, provided that reliability and accuracy of the communication are satisfied.

Hereinafter, for ease of understanding and explanation, the maximum value in the quality threshold range is referred to as a threshold of quality ThA (i.e., an example of the first threshold of quality), and the minimum value in the quality threshold range is referred to as a threshold of quality ThB (i.e., an example of the second threshold of quality).

It needs to be explained that there may be multiple values in the quality threshold range, and in this case, the threshold of quality ThA and the threshold of quality ThB are different; alternatively, there may be one value in the quality threshold range, and in this case, the threshold of quality ThA and the threshold of quality ThB are the same, and it is not particularly limited in the present disclosure.

In the implementation of the present disclosure, the quality threshold range may be determined by the network device #A and sent to the terminal device #A.

Optionally, the method further comprises: the first terminal device receives the indication information of the first threshold of quality sent by the first network device.

Optionally, the method further comprises: the first terminal device receives the indication information of the second threshold of quality and the indication information of the reference quality sent by the first network device.

In addition, in the implementation of the present disclosure, the quality threshold range may be determined by the network device #A or the terminal device #A according to the code rate #A.

For example, a one-to-one mapping relationship between a plurality of code rates and a plurality of quality ranges may be stored in the terminal device #A or the network device #A, and thereby the terminal device #A or the network device #A may determine a quality range corresponding to the code rate #A from the mapping relationship based on the currently used code rate (for example, the code rate #A) as the quality range currently used for determining the reporting policy.

Optionally, the first threshold of quality is determined according to the recommended code rate.

Or, optionally, the second threshold of quality is determined according to the recommended code rate.

Next, an exemplary description is made about a relationship between a comparison result of the quality of the link #A and the quality threshold range (for example, the maximum value in the quality threshold range, that is, the first threshold of quality), a comparison result of the code rate #B and the recommended code rate, and the determined reporting policy.

Situation 1

Performing, by the first terminal device, the reporting process of the link quality of the first link according to the first relationship and the second relationship comprises: if the first relationship is that the link quality of the first link is greater than or equal to the first threshold of quality and the second relationship is that the first code rate is less than the recommended code rate, the first terminal device does not report the link quality of the first link to the first network device.

Specifically, if the quality of the link #A is higher than (or greater than or equal to) the threshold of quality ThA, and the code rate #B is less than the recommended code rate, the terminal device #A may determine that the reporting policy is: not to report the link quality of the link #A to the network device #A.

Since the quality of the link #A is higher than the threshold of quality ThA, if the terminal device #A reports the quality of the link #A to the network device #A, the network device #A will determine that it is necessary to make an adjustment by increasing a current code rate. The adjustment may cause an adjusted code rate (referred to as target code rate) determined by network device #A to be greater than the recommended code rate.

Moreover, since the code rate #B is less than the recommended code rate, it causes that the code rate #B is less than the target code rate, and as described above, the code rate #B is the code rate applicable to the terminal device #A and/or the terminal device #B, which means the terminal device #A and/or terminal device #B cannot support the target code rate.

If the terminal device #A still reports the quality of the link #A to the network device #A according to the prior art, an expected effect of the adjustment may not be achieved, and the adjustment process fails, resulting in a waste of communication resources and processing resources.

In contrast, in the implementation of the present disclosure, when the terminal device #A determines that the quality of the link #A is higher than the threshold of quality ThA, and the code rate #B is less than the recommended code rate, the terminal device #A does not report the quality of link #A to the network device #A, which may avoid the waste of communication resources and processing resources in the reporting process.

Situation 2

Performing, by the first terminal device, the reporting process of the link quality of the first link according to the first relationship and the second relationship comprises: if the first relationship is that the link quality of the first link is greater than or equal to the first threshold of quality and the second relationship is that the first code rate is greater than or equal to the recommended code rate, the first terminal device reports the link quality of the first link to the first network device.

Specifically, since the quality of the link #A is higher than the threshold of quality ThA, if the terminal device #A reports the quality of the link #A to the network device #A, the network device #A determines that it is necessary to make an adjustment by increasing a current code rate. The adjustment may cause an adjusted code rate (referred to as target code rate) determined by network device #A to be greater than the recommended code rate.

Moreover, since the code rate #B is greater than or equal to the recommended code rate, it causes that the code rate #B may be greater than or equal to the target code rate, and as described above, the code rate #B is the code rate applicable to the terminal device #A and/or the terminal device #B, which means the terminal device #A and/or terminal device #B may support the target code rate.

According to the implementation of the present disclosure, in this case, the terminal device #A may report the quality of the link #A to the network device #A.

As an example but not limitation, in the implementation of the present disclosure, the terminal device #A may determine the reporting policy based on a comparison result (i.e., an example of a third relationship) of the quality of the link #A and a predetermined quality threshold range (e.g., comprising the first threshold of quality and the second threshold of quality), and a comparison result (i.e., an example of a fourth relationship) of the quality of the link #A and the reference quality range.

Optionally, performing, by the first terminal device, a reporting process of link quality of the first link according to the link quality of the first link and the first code rate comprises: the first terminal device performs the reporting process of the link quality of the first link according to a third relationship and a fourth relationship, wherein the third relationship is a relationship between the link quality of the first link and a predetermined second threshold of quality, the fourth relationship is a relationship between the link quality of the first link and a reference quality, and the reference quality is determined according to the first code rate.

That is, in the implementation of the present disclosure, the reporting policy may be determined as described in Table 1 below.

TABLE 1

| First code rate | Reference code rate | Link quality | Result |
|---|---|---|---|
| R1, R2 (R1 < R4, R2 < R4) | R4 | Higher than ThA | Not report measurement report |
| R1, R2, R3, R4 (R3 < R4) | R4 | Higher than ThA | Report measurement report |

Mode 2

Optionally, performing, by the first terminal device, a reporting process of link quality of the first link according to the link quality of the first link and the first code rate comprises: the first terminal device performs the reporting process of the link quality of the first link according to a third relationship and a fourth relationship, wherein the third relationship comprises a relationship between the link quality of the first link and a predetermined second threshold of quality, the fourth relationship is a relationship between the link quality of the first link and a reference quality, and the reference quality is determined according to the first code rate.

Specifically, as an example but not limitation, in the implementation of the present disclosure, the terminal device #A may determine the reporting policy based on a comparison result (i.e., an example of the third relationship) of the quality of the link #A and a predetermined quality threshold range (e.g., comprising the first threshold of quality and the second threshold of quality), and a comparison result (i.e., an example of the fourth relationship) of the quality of the link #A and the reference quality range (e.g., comprising the first reference quality and the second reference quality).

Next, an exemplary description is made about a relationship between a comparison result of the quality of the link #A and the quality threshold range (for example, the minimum value in the quality threshold range, that is, the second threshold of quality), a comparison result of the quality of the link #A and the reference quality range, and the determined reporting policy.

Situation 3

Performing, by the first terminal device, the reporting process of the link quality of the first link according to the third relationship and the fourth relationship comprises: if the third relationship is that the link quality of the first link is less than or equal to the second threshold of quality and the fourth relationship is that the link quality of the first link is greater than or equal to the first reference quality, the first terminal device does not report the link quality of the first link to the first network device.

Specifically, when the quality of the link #A is lower than (or less than or equal to) the threshold of quality ThB, and the quality of the link #A is greater than or equal to the reference quality ThmaxA, the terminal device #A may determine that the reporting policy is: not to report the quality of link #A to network device #A.

Since the quality of the link #A is lower than the threshold of quality ThB, if the terminal device #A reports the quality of the link #A to the network device #A, the network device #A determines that it is necessary to make an adjustment by reducing a current code rate. And since the quality of the link #A is greater than or equal to the reference quality ThmaxA, it indicates that the code rate #B is not applicable to the quality of the link #A, that is, the currently used code rate (for example, the code rate #A) is greater than the code rate #B. Therefore, it may occur that even if the adjustment is performed in such a manner as to reduce the current code rate, but if the adjustment amount is small, the adjusted code rate is still higher than the code rate #B.

If the terminal device #A still reports the quality of the link #A to the network device #A according to the prior art, it may cause that the adjusted code rate determined by the network device #A (referred to as the target code rate) is greater than the code rate #B. As described above, the code rate #B is a code rate applicable to the terminal device #A and/or the terminal device #B, which means that the terminal device #A and/or the terminal device #B cannot support the target code rate, so that the adjustment cannot achieve the expected effect, and the adjustment process fails, resulting in a waste of communication resources and processing resources.

In contrast, in the implementation of the present disclosure, when the terminal device #A determines that the quality of the link #A is lower than the threshold of quality ThB, and the quality of the link #A is greater than or equal to the reference quality ThmaxA, the terminal device #A does not report the quality of the link #A to the network device #A, which may avoid the waste of communication resources and processing resources in the reporting process.

Situation 4

Performing, by the first terminal device, the reporting process of the link quality of the first link according to the third relationship and the fourth relationship comprises: if the third relationship is that the link quality of the first link is less than or equal to the second threshold of quality and the fourth relationship is that the link quality of the first link is less than the second reference quality, the first terminal device reports the link quality of the first link to the first network device.

Specifically, since the quality of the link #A is lower than the threshold of quality ThB, if the terminal device #A reports the quality of the link #A to the network device #A, the network device #A determines that it is necessary to make an adjustment by reducing the current code rate.

Moreover, since the quality of the link #A is less than the reference quality ThmaxB, it indicates that the code rate #B is applicable to the quality of the link #A, that is, the currently used code rate (for example, the code rate #A) is less than the code rate #B.

Therefore, the adjustment is performed in such a manner as to reduce the current code rate, so that the adjusted code rate is lower than the code rate #B. As described above, the code rate #B is a code rate applicable to the terminal device #A and/or the terminal device #B, which means that the terminal device #A and/or the terminal device #B may support the adjusted code rate.

According to an implementation of the present disclosure, in this case, the terminal device #A may report the quality of the link #A to the network device #A.

That is, in the implementation of the present disclosure, the reporting policy may be determined as described in Table 2 below.

TABLE 2

| Link quality | Result |
|---|---|
| Lower than ThB and higher than ThmaxA (ThmaxA is the upper limit of the quality range to which the first code rate is applicable) | Not report measurement report |
| Lower than ThB and lower than ThmaxB (ThmaxB is the lower limit of the quality range to which the first code rate is applicable) | Report measurement report |

At S330, the network device #A may perform an adjustment process for the code rate used by the terminal device #A based on the quality of the link #A reported by the terminal device #A, wherein the process and method of the adjustment process may be similar to those in the prior art, hereby detailed description is omitted in order to avoid redundancy.

According to the method for wireless communication in the implementation of the present disclosure, after measuring the quality of the link, the terminal device determines whether the quality of the link and the first code rate meet a predetermined condition, and determines whether to report the quality of the link according to the determination result. Since the predetermined condition is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Optionally, the method further comprises: the first terminal device sends indication information of the first code rate to the first network device.

Specifically, in the implementation of the present disclosure, when the terminal device #A reports the quality of the link #A to the network device #A, the indication information of the code rate #B may be reported to the network device #A together. The network device #B may determine a target code rate to which the code rate currently used by the terminal device #A needs to be adjusted based on the quality of the link #A, and the method and process for determining the target code rate may be similar to those in the prior art. Here, in order to avoid redundancy, a detailed description thereof is omitted. Thereafter, the network device #B may determine whether to transmit the target code rate to the terminal device #A based on the relationship between the target code rate and the code rate #B.

As an example but not limitation, if the target code rate is greater than the code rate #B, as described above, the code rate #B is a code rate applicable to the terminal device #A and/or the terminal device #B, it means that the terminal device #A and/or the terminal device #B cannot support the target code rate. At this time, the network device #B may not deliver the target code rate to the terminal device #A.

For another example, if the target code rate is less than the code rate #B, as described above, the code rate #B is a code rate applicable to the terminal device #A and/or the terminal device #B, it means that the terminal device #A and/or the terminal device #B may support the target code rate. At this time, the network device #B may deliver the target code rate to the terminal device #A.

According to the method for wireless communication in the implementation of the present disclosure, after the terminal device measures the quality of the link, the terminal device reports the quality of the link and the first code rate to the network device. Since the predetermined condition is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Figure 4:
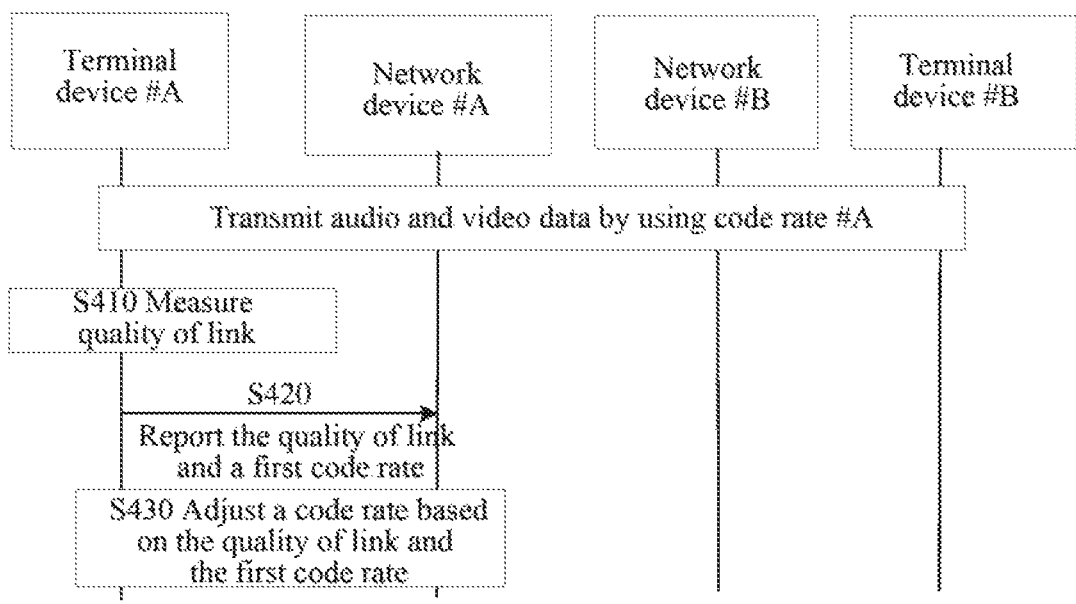
FIG. 4 is a schematic diagram of interactions of another example of a method for wireless communication according to an implementation of the present disclosure.

FIG. 4 is a schematic diagram of interactions in another example of a method for wireless communication according to an implementation of the present disclosure. As shown in FIG. 4, when terminal device #A (i.e., an example of a first terminal device) performs wireless communication (e.g., transmitting voice data) with terminal device #B (i.e., a second terminal device), the terminal device #A may encode (or may be referred to as compression processing) the data to be transmitted by using a code rate #A, and send the obtained data to a network device #A accessed by the terminal device #A, and the network device #A sends the data to a network device #B accessed by the terminal device #B, and thereby the network device #B may transmit the data to the terminal device #B, wherein the code rate #A may be a code rate specified by a system, or a code rate that the network device #A indicates to the terminal device #A by signaling, or a code rate determined by a negotiation of the terminal device #A and the terminal device #B (for example, via the network device #A and the network device #B).

In the implementation of the present disclosure, one or more code rates to which the terminal device #A may be applied are referred to as a set of code rate #A, and one or more code rates to which the terminal device #B may be applied are referred to as a set of code rate #B. Then, the above code rate #A may belong to the set of code rate #A, and belong to the set of code rate #B. That is, both the terminal device #A and the terminal device #B may support the code rate #A, thereby it is ensured that the terminal device #A may complete encoding of data based on the code rate #A, and ensured that the terminal device #B may complete decoding of the data based on the code rate #A.

In the implementation of the present disclosure, the quality of link #A (that is, an example of a first link) between the terminal device #A and the network device #A may be dynamically changed. Therefore, in the implementation of the present disclosure, a reporting mechanism for reporting the quality of the link may be introduced, that is, the terminal device #A may, for example, periodically detect the quality of the link #A and report it to the network device #A, and thereby the network device #A may adjust the code rate #A based on the quality of the link #A, thereby the adjusted code rate may ensure the accuracy of the communication under the quality of the link #A reported by the terminal device #A.

Thus, at S410, the terminal device #A may measure the quality of the link #A. It needs to be explained that the method and the process that the terminal device #A measures the quality of the link #A may be similar to those in the prior art. In order to avoid redundancy, detailed description thereof is omitted.

At S420, the terminal device #A may report a code rate #B (that is, an example of a first code rate) when reporting the link quality to the network device #A.

The code rate #B may be one or more, and it is not particularly limited in the present disclosure.

Optionally, the first code rate is a smaller one of a maximum code rate applicable to the first terminal device and a maximum code rate applicable to the second terminal device, or the first code rate is an intersection of a set of code rates applicable to the first terminal device and a set of code rates applicable to the second terminal device, or the first code rate is a maximum code rate applicable to the first terminal device, or the first code rate is a set of code rates applicable to the first terminal device, or the first code rate is a maximum code rate applicable to the second terminal device, or the first code rate is a set of code rates applicable to the second terminal device.

Specifically, the code rate #B may be determined according to one or more code rates (for example, the set of code rate #A) applicable to the terminal device #A. For example, the code rate #B may be part or all of the code rates in the set of code rate #A. Also, in this case, as an example but not limitation, a higher layer (e.g., an application layer or an IMS layer) may indicate the set of code rate #A to the terminal device #A.

Optionally, the code rate #B may be determined according to one or more code rates (for example, the above set of code rate #B) applicable to the terminal device #B. For example, the code rate #B may be part or all of the code rates in the set of code rate #B. In this case, for example, the terminal device #B may transmit indication information of the set of code rate #B to the terminal device #A via the network device #B and the network device A. For example, the operator, or the network administrator may obtain the set of code rate #B, and send the indication information of the set of code rate #B to the terminal device #A, so that the terminal device #A acquires the set of code rate #B. Optionally, a higher layer (e.g., an application layer or an IMS layer) may indicate the set of code rate #B to the terminal device #A.

Optionally, the code rate #B may be determined according to the set of code rate #A and the set of code rate #B. For example, the code rate #B may be a code rate belonging to both the set of code rate #A and the set of code rate #B.

Optionally, the terminal device #A may use a maximum code rate of the intersection of the set of code rate #A and the set of code rate #B as the code rate #B.

Optionally, the terminal device #A may use part or all of the code rates in the intersection of the set of code rate #A and the set of code rate #B as the code rate #B.

As an example but not limitation, the above code rate #B is determined by an encoding and decoding set suggested by a higher level (such as an application layer or IMS layer) and/or an encoding and decoding set suggested by an access layer. The encoding and decoding set suggested by the higher layer (such as the application layer or the IMS layer) may further include an encoding and decoding set that can be used by the peer terminal for communication.

Thus, at S430, the network device #B may determine a target code rate to which the code rate currently used by the terminal device #A needs to be adjusted based on the quality of the link #A, and the method and process for determining the target code rate may similar to those in the prior art, detailed descriptions thereof are omitted herein to avoid redundancy.

Thereafter, the network device #B may determine whether to transmit the target code rate to the terminal device #A based on a relationship between the target code rate and the code rate #B.

For example, optionally, performing, by the first network device, an adjustment process of a code rate currently used by the first terminal device according to a relationship between the target code rate and the first code rate comprises: if the first code rate is less than or equal to the target code rate, the first network device does not adjust the code rate currently used by the first terminal device.

Specifically, if the target code rate is greater than the code rate #B, as described above, the code rate #B is a code rate applicable to the terminal device #A and/or the terminal device #B, it means that the terminal device #A and/or the terminal device #B cannot support the target code rate. At this time, the network device #B may not deliver the target code rate to the terminal device #A.

For example, optionally, performing, by the first network device, an adjustment process of a code rate currently used by the first terminal device according to a relationship between the target code rate and the first code rate comprises: if the first code rate is greater than the target code rate, the first network device adjusts the code rate currently used by the first terminal device to the target code rate.

Specifically, if the target code rate is less than the code rate #B, as described above, the code rate #B is a code rate applicable to the terminal device #A and/or the terminal device #B, it means that the terminal device #A and/or the terminal device #B may support the target code rate. At this time, the network device #B may deliver the target code rate to the terminal device #A.

In addition, in the implementation of the present disclosure, before the terminal device #A reports the quality of the link #A and the code rate #B to the network device #A, it may also determine whether the quality of the link #A and the code rate #B are required.

In the implementation of the present disclosure, the quality of the link #A may be used as a determination parameter when the terminal device #A determines whether to report the quality of the link.

Specifically, as an example but not limitation, in the implementation of the present disclosure, the terminal device #A may determine the reporting policy (i.e., whether the quality of the link #A and the code rate #B are reported) based on a comparison result of the quality of the link #A and a predetermined quality threshold range (e.g., comprising a first threshold of quality and a second threshold of quality).

Hereinafter, for ease of understanding and explanation, the maximum value in the quality threshold range is referred to as a threshold of quality ThA (i.e., an example of the first threshold of quality), and the minimum value in the quality threshold range is referred to as a threshold of quality ThB (i.e., an example of the second threshold of quality).

It needs to be explained that there are multiple values in the quality threshold range, and in this case, the threshold of quality ThA and the threshold of quality ThB are different. Optionally, there is one value in the quality threshold range, and in this case, the threshold of quality ThA and the threshold of quality ThB are the same, and it is not particularly limited in the present disclosure.

In the implementation of the present disclosure, the quality threshold range may be determined by the network device #A and sent to the terminal device #A.

Optionally, the method further comprises: the first terminal device receives the indication information of the first threshold of quality sent by the first network device.

Optionally, the method further comprises: the first terminal device receives the indication information of the second threshold of quality and the indication information of a reference quality sent by the first network device.

In addition, in the implementation of the present disclosure, the quality threshold range may be determined by the network device #A or the terminal device #A according to the code rate #A.

For example, a one-to-one mapping relationship between a plurality of code rates and a plurality of quality ranges may be stored in the terminal device #A or the network device #A, and thereby the terminal device #A or the network device #A may determine a quality range corresponding to the code rate #A from the mapping relationship based on the currently used code rate (for example, the code rate #A) as the quality range currently used for determining the reporting policy.

Optionally, the first threshold of quality is determined according to a recommended code rate.

Or, optionally, the second threshold of quality is determined according to the recommended code rate.

Next, an exemplary description is made about a relationship between a comparison result of the quality of the link #A and the quality threshold range (for example, the maximum value in the quality threshold range, that is, the first threshold of quality) and the determined reporting policy.

For example, optionally, sending, by the first terminal device, indication information of the link quality of the first link and indication information of the first code rate to the first network device comprises: after determining that the link quality of the first link is greater than or equal to the predetermined first threshold of quality, the first terminal device sends the indication information of the link quality of the first link and the indication information of the first code rate to the first network device.

Specifically, when the quality of the link #A is higher than (or greater than or equal to) the threshold of quality ThA, the terminal device #A may determine that the reporting policy is: to report the link quality of the link #A to the network device #A.

That is, since the threshold of quality ThA is the upper limit of the quality used by the currently used code rate (for example, the code rate #A), if the quality of link #A is higher than the threshold of quality ThA, it means that the current link quality may be applied to a higher code rate. Thus, the network device #A may adjust the code rate currently used by the terminal device #A based on the quality of the link #A and the code rate #B.

Conversely, if the quality of link #A is below (less than or equal to) the threshold of quality ThA, then the current link quality may not be applicable to a higher code rate. Thus, the network device #A may not adjust the code rate currently used by the terminal device #A.

For example, optionally, sending, by the first terminal device, indication information of the link quality of the first link and indication information of the first code rate to the first network device comprises: after determining that the link quality of the first link is less than or equal to the predetermined second threshold of quality, the first terminal device sends the indication information of the link quality of the first link and the indication information of the first code rate to the first network device.

Specifically, when the quality of the link #A is lower than (or less than) the threshold of quality ThB, the terminal device #A may determine that the reporting policy is: to report the quality of the link #A to the network device #A.

That is, since the threshold of quality ThB is the lower limit of the quality used by the currently used code rate (for example, the code rate #A), if the quality of the link #A is lower than the threshold of quality ThA, it means that the code rate #A cannot be used under the current link quality. Thus, the network device #A may adjust the code rate currently used by the terminal device #A based on the quality of the link #A and the code rate #B.

Conversely, when the quality of link #A is higher than (greater than or equal to) the threshold of quality ThB, it means that the current link quality may be applicable to the code rate #A. Thus, network device #A may not adjust the code rate currently used by the terminal device #A.

According to the method of wireless communication in the implementation of the present disclosure, after the terminal device measures the quality of the link, the terminal device reports the quality of the link and the first code rate to the network device. Since the first code rate is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

In the foregoing, methods for wireless communication according to implementations of the present disclosure are described in detail with reference to FIG. 1 to FIG. 4. In the following, apparatus for wireless communication according to implementations of the present disclosure will be described in detail with reference to FIG. 5 to FIG. 7.

Figure 5:
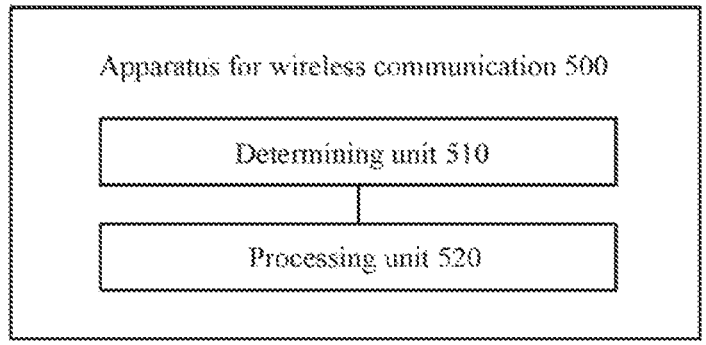
FIG. 5 is a schematic block diagram of an example of an apparatus for wireless communication according to an implementation of the present disclosure.

FIG. 5 is a schematic block diagram of an apparatus 500 for wireless communication according to an implementation of the present disclosure. As shown in FIG. 5, the apparatus 500 comprises: a determining unit 510, configured to measure link quality of a first link when the apparatus 500 and a second terminal device perform wireless communication via a first network device, wherein the first link is a link between the apparatus 500 and the first network device; and a processing unit 520, configured to perform, according to the link quality of the first link and a first code rate, a reporting process for reporting the link quality of the first link, wherein the first code rate is determined according to a code rate applicable to the apparatus 500, or determined according to a code rate applicable to the second terminal device.

Optionally, the first code rate is a smaller one of a maximum code rate applicable to the apparatus 500 and a maximum code rate applicable to the second terminal device, or an intersection of a set of code rates applicable to the apparatus 500 and a set of code rates applicable to the second terminal device, or the maximum code rate applicable to the apparatus 500, or the set of code rates applicable to the apparatus 500, or the maximum code rate applicable to the second terminal device, or the set of code rates applicable to the second terminal device.

Optionally, the processing unit 520 is configured to perform the reporting process for reporting the link quality for the first link according to a first relationship and a second relationship, wherein the first relationship is a relationship between the link quality of the first link and a predetermined first threshold of quality, the second relationship is a relationship between the first code rate and a recommended code rate, and the recommended code rate is a code rate that, before a current time, the first network device most recently indicates to be used by the apparatus 500.

Optionally, the processing unit 520 is configured to: not report the link quality of the first link to the first network device, if the first relationship is that the link quality of the first link is greater than or equal to the first threshold of quality and the second relationship is that the first code rate is less than the recommended code rate; or the processing unit 520 is configured to report the link quality of the first link to the first network device, if the first relationship is that the link quality of the first link is greater than or equal to the first threshold of quality and the second relationship is that the first code rate is greater than or equal to the recommended code rate.

Optionally, the apparatus 500 further comprises: a communication unit, configured to receive indication information of the first threshold of quality sent by the first network device.

Optionally, the first threshold of quality is determined according to the recommended code rate.

Optionally, the processing unit 520 is configured to perform the reporting process for reporting the link quality of the first link according to a third relationship and a fourth relationship, wherein the third relationship is a relationship between the link quality of the first link and a predetermined second threshold of quality, the fourth relationship is a relationship between the link quality of the first link and a reference quality, and the reference quality is determined according to the first code rate.

Optionally, the processing unit 520 is configured to: not report the link quality of the first link to the first network device, if the third relationship is that the link quality of the first link is less than or equal to the second threshold of quality and the fourth relationship is that the link quality of the first link is greater than or equal to a first reference quality; or the processing unit 520 is configured to report the link quality of the first link to the first network device, if the third relationship is that the link quality of the first link is less than or equal to the second threshold of quality and the fourth relationship is that the link quality of the first link is less than a second reference quality.

Optionally, the apparatus 500 further comprises: a communication unit, configured to receive indication information of the second threshold of quality and indication information of the reference quality that are sent by the first network device.

Optionally, the second threshold of quality is determined according to the recommended code rate.

Optionally, the apparatus 500 further comprises: a communication unit, configured to send indication information of the first code rate to the first network device.

The apparatus 500 for wireless communication according to the implementation of the present disclosure may correspond to the first terminal device (for example, the terminal device #A) in the method of the implementation of the present disclosure, and each unit/module of the apparatus 500 for the wireless communication and other operations and/or functions in order to implement corresponding processes performed by the terminal device #A in the method 300 in FIG. 3 are not described herein for brevity.

According to the apparatus for wireless communication in the implementation of the present disclosure, after measuring the quality of the link, the terminal device determines whether the quality of the link and the first code rate meet a predetermined condition, and determines whether to report the quality of the link according to the determination result. Since the predetermined condition is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Figure 6:
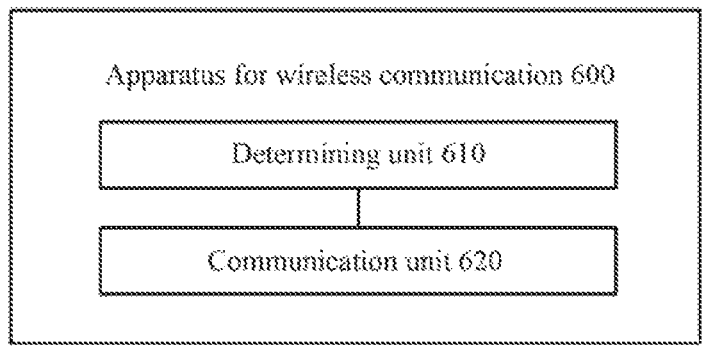
FIG. 6 is a schematic block diagram of another example of an apparatus for wireless communication according to an implementation of the present disclosure.

FIG. 6 is a schematic block diagram of an apparatus 600 for wireless communication according to an implementation of the present disclosure. As shown in FIG. 6, the apparatus 600 comprises: a determining unit 610, configured to measure link quality of a first link when the apparatus and a second terminal device perform wireless communication via a first network device, wherein the first link is a link between the apparatus and the first network device; and a communication unit 620, configured to send indication information of the link quality of the first link and indication information of a first code rate to the first network device, wherein the first code rate is determined according to a code rate applicable to the apparatus, or determined according to a code rate applicable to the second terminal device.

Optionally, the first code rate is a smaller one of a maximum code rate applicable to the apparatus 600 and a maximum code rate applicable to the second terminal device, or an intersection of a set of code rates applicable to the apparatus 600 and a set of code rates applicable to the second terminal device, or the maximum code rate applicable to the apparatus 600, or the set of code rates applicable to the apparatus 600, or the maximum code rate applicable to the second terminal device, or the set of code rates applicable to the second terminal device.

Optionally, the communication unit 620 is configured to send the indication information of the link quality of the first link and the indication information of the first code rate to the first network device, after the determining unit 610 determines that the link quality of the first link is greater than or equal to a predetermined first threshold of quality.

Optionally, the communication unit 620 is further configured to receive indication information of the first threshold of quality sent by the first network device.

Optionally, the first threshold of quality is determined according to a recommended code rate.

Optionally, the communication unit 620 is configured to send the indication information of the link quality of the first link and the indication information of the first code rate to the first network device after the determining unit 610 determines that the link quality of the first link is less than or equal to a predetermined second threshold of quality.

Optionally, the communication unit 620 is further configured to receive indication information of the second threshold of quality sent by the first network device.

Optionally, the second threshold of quality is determined according to a recommended code rate.

The apparatus 600 for wireless communication according to the implementation of the present disclosure may correspond to the first terminal device (for example, the terminal device #A) in the method of the implementation of the present disclosure, and each unit/module of the apparatus 600 of the wireless communication and other operations and/or functions in order to implement corresponding processes performed by the terminal device #A in the method 400 in FIG. 4 are not described herein for brevity.

According to the apparatus for wireless communication in the implementation of the present disclosure, after the terminal device measures the quality of the link, the terminal device reports the quality of the link and the first code rate to the network device. Since the first code rate is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Figure 7:
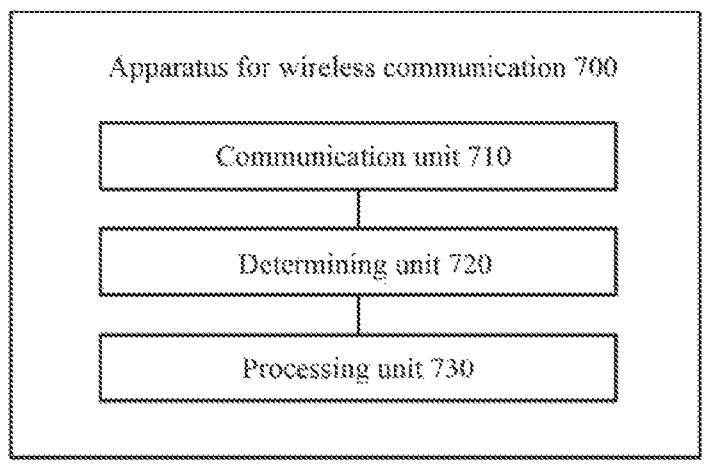
FIG. 7 is a schematic block diagram of another example of an apparatus for wireless communication according to an implementation of the present disclosure.

FIG. 7 is a schematic block diagram of an apparatus 700 for wireless communication according to an implementation of the present disclosure. As shown in FIG. 7, the apparatus 700 comprises: a communication unit 710, configured to receive, when a first terminal device and a second terminal device perform wireless communication via the apparatus, indication information of link quality of a first link and indication information of a first code rate that are sent by the first terminal device, wherein the first link is a link between the first terminal device and the apparatus, and the first code rate is determined according to a code rate applicable to the first terminal device, or determined according to a code rate applicable to the second terminal device; a determining unit 720, configured to determine a target code rate according to the link quality of the first link; and a processing unit 730, configured to perform an adjustment process of a code rate currently used by the first terminal device according to a relationship between the target code rate and the first code rate.

Optionally, the first code rate is a smaller one of a maximum code rate applicable to the first terminal device and a maximum code rate applicable to the second terminal device, or an intersection of a set of code rates applicable to the first terminal device and a set of code rates applicable to the second terminal device, or the maximum code rate applicable to the first terminal device, or the set of code rates applicable to the first terminal device, or the maximum code rate applicable to the second terminal device, or the set of code rates applicable to the second terminal device.

Optionally, the processing unit 730 is configured to: not adjust the code rate currently used by the first terminal device if the first code rate is less than or equal to the target code rate.

Optionally, the processing unit 730 is configured to adjust the code rate currently used by the first terminal device to the target code rate if the first code rate is greater than the target code rate.

The apparatus 700 for wireless communication according to the implementation of the present disclosure may correspond to the first network device (for example, the network device #A) in the method of the implementation of the present disclosure, and each unit/module of the apparatus 700 for the wireless communication and other operations and/or functions in order to implement corresponding processes performed by the network device #A in the method 400 in FIG. 4 are not described herein for brevity.

According to the apparatus for wireless communication in the implementation of the present disclosure, after the terminal device measures the quality of the link, the terminal device reports the quality of the link and the first code rate to the network device. Since the first code rate is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Methods for wireless communication according to implementations of the present disclosure are described above in detail with reference to FIG. 1 to FIG. 4. Devices for wireless communication according to implementations of the present disclosure will be described below in detail with reference to FIG. 8 to FIG. 10

Figure 8:
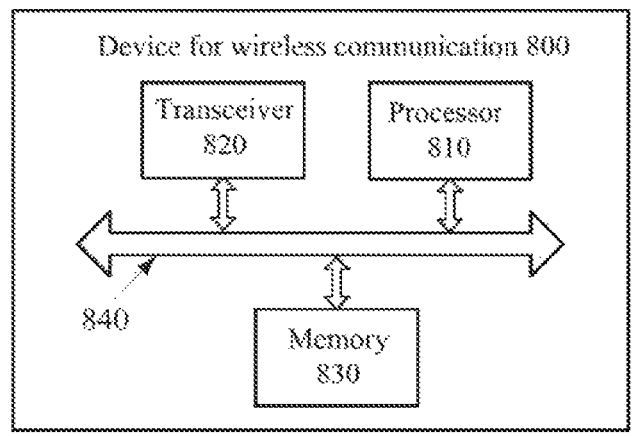
FIG. 8 is a schematic block diagram of an example of a device for wireless communication according to an implementation of the present disclosure.

FIG. 8 is a schematic block diagram of a device 800 for wireless communication according to an implementation of the present disclosure. As shown in FIG. 8, the device 800 comprises a processor 810 and a transceiver 820. The processor 810 is connected to the transceiver 820. Optionally, the device 800 further comprises a memory 830. The memory 830 is connected to the processor 810, and further optionally, the device 800 comprises a bus system 840. The processor 810, the memory 830, and the transceiver 820 may be connected by the bus system 840, and the memory 830 may be used to store instructions, and the processor 810 may be used to execute instructions stored in the memory 830 to control the transceiver 820 to transmit information or signals.

The processor 810 is configured to measure link quality of a first link when the device 800 performs wireless communication with a second terminal device via a first network device, wherein the first link is a link between the device 800 and the first network device.

The processor 810 is configured to control, according to the link quality of the first link and a first code rate, the transceiver 820 to perform a reporting process for reporting the link quality of the first link, wherein the first code rate is determined according to a code rate applicable to the device 800, or determined according to a code rate applicable to the second terminal device.

Optionally, the first code rate is a smaller one of a maximum code rate applicable to the device 800 and a maximum code rate applicable to the second terminal device.

Optionally, the processor 810 is configured to perform the reporting process for reporting the link quality of the first link according to a first relationship and a second relationship, wherein the first relationship is a relationship between the link quality of the first link and a predetermined first threshold of quality, the second relationship is a relationship between the first code rate and a recommended code rate, and the recommended code rate is a code rate that, before a current time, the first network device most recently indicates to be used by the device 800.

Optionally, the processor 810 is configured to: not report the link quality of the first link to the first network device if the first relationship is that the link quality of the first link is greater than or equal to the first threshold of quality and the second relationship is that the first code rate is less than the recommended code rate; or the processor 810 is configured to report the link quality of the first link to the first network device if the first relationship is that the link quality of the first link is greater than or equal to the first threshold of quality and the second relationship is that the first code rate is greater than or equal to the recommended code rate.

Optionally, the processor 810 is configured to control the transceiver 820 to receive indication information of the first threshold of quality sent by the first network device.

Optionally, the first threshold of quality is determined according to the recommended code rate.

Optionally, the processor 810 is specifically configured to perform the reporting process for reporting the link quality of the first link according to a third relationship and a fourth relationship, wherein the third relationship is a relationship between the link quality of the first link and a predetermined second threshold of quality, the fourth relationship is a relationship between the link quality of the first link and a reference quality, and the reference quality is determined according to the first code rate.

Optionally, the processor 810 is configured to: not report the link quality of the first link to the first network device if the third relationship is that the link quality of the first link is less than or equal to the second threshold of quality and the fourth relationship is that the link quality of the first link is greater than or equal to a first reference quality; or the processor 810 is configured to report the link quality of the first link to the first network device, if the third relationship is that the link quality of the first link is less than or equal to the second threshold of quality and the fourth relationship is that the link quality of the first link is less than a second reference quality.

Optionally, the processor 810 is configured to control the transceiver 820 to receive the indication information of the second threshold of quality and the indication information of the reference quality sent by the first network device.

Optionally, the second threshold of quality is determined according to the recommended code rate.

Optionally, the processor 810 is configured to control the transceiver 820 to send the indication information of the first code rate to the first network device.

The device 800 for wireless communication according to the implementation of the present disclosure may correspond to the first terminal device (for example, the terminal device #A) in the method of the implementation of the present disclosure, and each unit/module of the device 800 of the wireless communication and other operations and/or functions in order to implement corresponding processes performed by the terminal device #A in the method 300 in FIG. 3 are not described herein for brevity.

According to the device for wireless communication in the implementation of the present disclosure, after measuring the quality of the link, the terminal device determines whether the quality of the link and the first code rate meet a predetermined condition, and determines whether to report the quality of the link according to the determination result. Since the predetermined condition is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Figure 9:
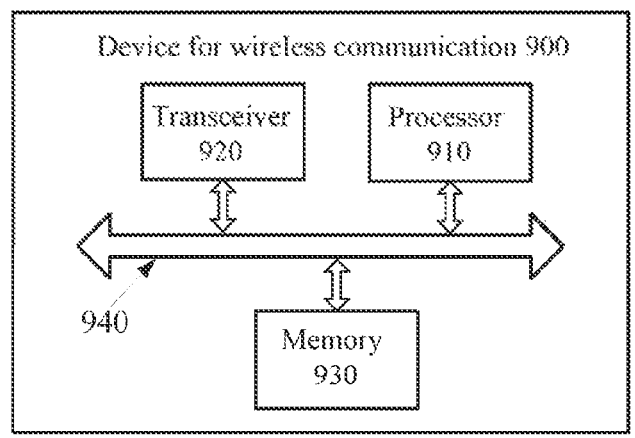
FIG. 9 is a schematic block diagram of another example of a device for wireless communication according to an implementation of the present disclosure.

FIG. 9 is a schematic block diagram of a device 900 for wireless communication according to an implementation of the present disclosure. As shown in FIG. 9, the device 900 comprises a processor 910 and a transceiver 920. The processor 910 is connected to the transceiver 920. Optionally, the device 900 further comprises a memory 930. The memory 930 is connected to the processor 910, and further optionally, the device 900 comprises a bus system 940. The processor 910, the memory 930, and the transceiver 920 may be connected by the bus system 940, and the memory 930 may be used to store instructions, and the processor 910 may be used to execute instructions stored in the memory 930 to control the transceiver 920 to transmit information or signals.

The processor 910 is configured to measure link quality of a first link when the device performs wireless communication with a second terminal device via a first network device, wherein the first link is a link between the device and the first network device.

The processor 910 is configured to control the transceiver 920 to send indication information of the link quality of the first link and indication information of a first code rate to the first network device, wherein the first code rate is determined according to a code rate applicable to the device, or determined according to a code rate applicable to the second terminal device.

Optionally, the first code rate is a smaller one of a maximum code rate applicable to the device and a maximum code rate applicable to the second terminal device.

Optionally, the processor 910 is configured to control the transceiver 920 to send indication information of the link quality of the first link and indication information of the first code rate to the first network device after determining that the link quality of the first link is greater than or equal to a predetermined first threshold of quality.

Optionally, the processor 910 is configured to control the transceiver 920 to receive indication information of the first threshold of quality sent by the first network device.

Optionally, the first threshold of quality is determined according to a recommended code rate.

Optionally, the processor 910 is configured to control the transceiver 920 to send indication information of the link quality of the first link and indication information of the first code rate to the first network device after determining that the link quality of the first link is less than or equal to a predetermined second threshold of quality.

Optionally, the processor 910 is configured to control the transceiver 920 to receive the indication information of the second threshold of quality sent by the first network device.

Optionally, the second threshold of quality is determined according to the recommended code rate.

The device 900 for wireless communication according to the implementation of the present disclosure may correspond to the first terminal device (for example, the terminal device #A) in the method of the implementation of the present disclosure, and each unit/module of the device 900 of the wireless communication and other operations and/or functions in order to implement corresponding processes performed by the terminal device #A in the method 400 in FIG. 4 are not described herein for brevity.

According to the device for wireless communication in the implementation of the present disclosure, after the terminal device measures the quality of the link, the terminal device reports the quality of the link and the first code rate to the network device. Since the first code rate is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

Figure 10:
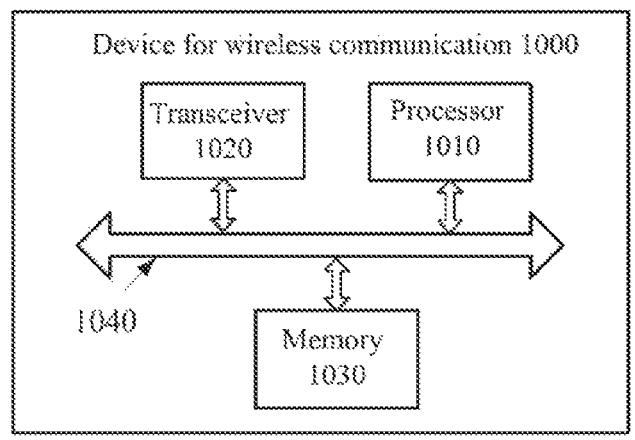
FIG. 10 is a schematic block diagram of another example of a device for wireless communication according to an implementation of the present disclosure.

FIG. 10 is a schematic block diagram of a device 1000 for wireless communication according to an implementation of the present disclosure. As shown in FIG. 10, the device 1000 comprises a processor 1010 and a transceiver 1020. The processor 1010 is connected to the transceiver 1020. Optionally, the device 1000 further comprises a memory 1030. The memory 1030 is connected to the processor 1010, and further optionally, the device 1000 comprises a bus system 1040. The processor 1010, the memory 1030, and the transceiver 1020 may be connected by the bus system 1040, and the memory 1030 may be used to store instructions, and the processor 1010 may be used to execute instructions stored in the memory 1030 to control the transceiver 1020 to transmit information or signals.

The processor 1010 is configured to control the transceiver 1020 to receive indication information of link quality of a first link and indication information of a first code rate sent by a first terminal device when the first terminal device and a second terminal device perform wireless communication via the device. The first link is a link between the first terminal device and the device, and the first code rate is determined according to a code rate applicable to the first terminal device, or determined according to a code rate applicable to the second terminal device.

The processor 1010 is configured to determine a target code rate according to the link quality of the first link.

The processor 1010 is configured to perform an adjustment process on a code rate currently used by the first terminal device according to a relationship between the target code rate and the first code rate.

Optionally, the first code rate is a smaller one of a maximum code rate applicable to the first terminal device and a maximum code rate applicable to the second terminal device.

Optionally, the processor 1010 is specifically configured to: not adjust a code rate currently used by the first terminal device if the first code rate is less than or equal to the target code rate.

Optionally, the processor 1010 is specifically configured to: if the first code rate is greater than the target code rate, adjust a code rate currently used by the first terminal device to the target code rate.

The device 1000 for wireless communication according to the implementation of the present disclosure may correspond to the first network device (for example, the network device #A) in the method of the implementation of the present disclosure, and each unit/module of the device 1000 of the wireless communication and other operations and/or functions in order to implement corresponding processes performed by the network device #A in the method 400 in FIG. 4 are not described herein for brevity.

According to the device of wireless communication in the implementation of the present disclosure, after the terminal device measures the quality of the link, the terminal device reports the quality of the link and the first code rate to the network device. Since the first code rate is determined based on a code rate applicable to the terminal device or the peer end, and it can ensure that after the quality of the link is reported, the adjusted code rate determined by the network device based on the quality of the link is supported by the terminal device or the peer end, thereby overhead of communication resources required to report the link quality can be reduced, and the processing load of the terminal device and the network device can be reduced.

It needs to be explained that, in the implementations of the present disclosure, "a code rate applicable to the terminal device" may include "a code rate that the terminal device can support" or "a code rate that the terminal device can use".

It should be noted that the above described implementations of methods of the present disclosure may be applied to a processor or implemented by the processor. The processor may be an integrated circuit chip with capabilities of signal processing. In a process of implementation, each act of the foregoing implementations of methods may be completed by an integrated logic circuit of hardware in the processor or an instruction in a form of software. The processor may be a general purpose processor, a Digital Signal Processor (DSP), an Application Specific Integrated Circuit (ASIC), a Field Programmable Gate Array (FPGA), other programmable logic devices, discrete gates or transistor logic devices, or discrete hardware components, which can implement or execute the methods, acts, and logical block diagrams disclosed in the implementations of the present disclosure. The general purpose processor may be a microprocessor, any conventional processor, or the like. The acts of the methods disclosed in the implementations of the present disclosure may be directly implemented by a hardware decoding processor, or may be performed by a combination of hardware and software modules in the decoding processor. Software modules can be located in a conventional storage medium in the related art, such as random access memory, flash memory, read only memory, programmable read only memory or electrically erasable programmable memory, registers, or the like. The storage medium is located in a memory, and the processor reads information in the memory and combines its hardware to complete the acts of the above methods.

It should be understood that a memory in the implementations of the present disclosure may be a volatile memory or a non-volatile memory, or it may include both volatile and non-volatile memory. The non-volatile memory may be a Read-Only Memory (ROM), a Programmable Read Only Memory (PROM), an Erasable Programmable Read Only Memory (Erasable PROM, EPROM), or an Electric Erase Programmable Read Only Memory (EEPROM) or flash memory. The volatile memory may be a Random Access Memory (RAM) that acts as an external high-speed cache. As an example but not limitation, many forms of RAM are available, such as Static Random Access Memory (SRAM), Dynamic Random Access Memory (DRAM), Synchronous Dynamic Random Access Memory (SDRAM), Double Data Rate SDRAM (DDR SDRAM), Enhanced Synchronous Dynamic Random Access Memory (ESDRAM), Synchronous Link Dynamic Random Access Memory (SLDRAM)) and Direct Rambus Random Access Memory (DR RAM). It should be noted that the memories of the systems and methods described herein are intended to comprise, but not limited to, these and any other suitable types of memories.

It should be understood that the "one implementation" or "an implementation" in the specification means that particular features, structures, or characteristics related to the implementations of the present disclosure may be included in at least one implementation of the present disclosure. Thus, "in one implementation" or "in an implementation" in the specification may not definitely refer to the same implementation. In addition, the implementations and the particular features, structures, or characteristics of the implementations may be combined in any suitable manner in one or more implementations if without conflict.

It should be understood that, in various implementations of the present disclosure, the values of the sequence numbers of the above processes do not imply the order of execution, and the order of execution of various processes should be determined by its function and internal logic, and it should not constitute any limitation to the implementation process of the implementations of the present disclosure.

It should be understood that in the implementations of the present disclosure, "B corresponding to A" means that B is associated with A, or B may be determined according to A. It should also be understood that determining B according to A does not mean that B is determined according to A only, but that B may also be determined according to A and/or other information.

It should be understood that the term "and/or" herein is merely an association relationship describing associated objects, indicating that there may be three relationships, for example, A and/or B may indicate three cases: only A exists, both A and B exist, or only B exists. In addition, the symbol "/" in the present disclosure generally indicates that objects before and after the symbol have a relationship of "or".

Those of ordinary skill in the art will realize that elements and algorithm acts of the various examples described in connection with the implementations disclosed herein may be implemented in electronic hardware or a combination of computer software and electronic hardware. Whether these functions are performed in hardware or software depends on the specific application and design constraints of a solution. A person skilled in the art may use different methods for implementing the described functions for each particular application, but such implementation should not be considered to be beyond the scope of the present disclosure.

A person skilled in the art may clearly understand that for the convenience and brevity of the description, the specific working processes of the system, the apparatus and the unit described above may refer to the corresponding processes in the foregoing implementations of methods, and details are not described herein again.

In the several implementations provided by the present application, it should be understood that the disclosed systems, apparatuses, and methods may be implemented in other manners. For example, the implementations of apparatuses described above are merely illustrative. For example, the division of units is only a division of logical functions. In actual implementation, there may be another division manner, for example, multiple units or components may be combined or may be integrated into another system, or some features may be ignored or not executed. In addition, the coupling or direct coupling or communication connection shown or discussed may be an indirect coupling or communication connection through some interface, apparatus or unit, and may be electrical, mechanical or otherwise.

The units described as separate components may or may not be physically separated, and the components displayed as units may or may not be physical units, that is, they may be located in one place or may be distributed over multiple network units. Some or all of the units may be selected according to actual needs to achieve the purpose of the solution of the implementation.

In addition, various functional units in various implementations of the present disclosure may be integrated into one processing unit, or each unit may exist physically separately, or two or more units may be integrated into one unit.

The above implementations are only specific implementation of the present disclosure, but the scope of the present disclosure is not limited thereto, and within the technical scope of the present disclosure, any person skilled in the art may easily conceive changes or substitutions which should be covered by the scope of the present disclosure. Therefore, the protection scope of the present disclosure should be determined by the scope of the appended claims.

What I claim is:

1. A method for wireless communication, comprising:
   when a first terminal device and a second terminal device perform wireless communication via a first network device, measuring, by the first terminal device, link quality of a first link, wherein the first link is a link between the first terminal device and the first network device; and
   determining, by the first terminal device, a reporting policy for the link quality of the first link according to the link quality of the first link and a first code rate, wherein the first code rate is determined according to a code rate applicable to the second terminal device; and
   when the reporting policy is to report the link quality of the first link, sending, by the first terminal device, indication information of the first code rate to the first network device, wherein the first code rate is a maximum code rate applicable to the second terminal device or a set of code rates applicable to the second terminal device, wherein the first code rate is a code rate indicated by the first network device through a signaling to the first terminal device, and wherein the first code rate is determined independent of negotiation between the first terminal device and the second terminal device.

2. The method according to claim 1, wherein determining, by the first terminal device, the reporting policy for the link quality of the first link according to the link quality of the first link and the first code rate comprises:
performing, by the first terminal device, a reporting process for reporting the link quality of the first link according to a first relationship and a second relationship, wherein the first relationship is a relationship between the link quality of the first link and a predetermined first threshold of quality, the second relationship is a relationship between the first code rate and a recommended code rate, and the recommended code rate is a code rate that, before a current time, the first network device most recently indicates to be used by the first terminal device.

3. The method according to claim 2, wherein performing, by the first terminal device, the reporting process of the link quality of the first link according to the first relationship and the second relationship comprises:
when the first relationship is that the link quality of the first link is greater than or equal to the first threshold of quality and the second relationship is that the first code rate is less than the recommended code rate, not reporting, by the first terminal device, the link quality of the first link to the first network device; or
when the first relationship is that the link quality of the first link is greater than or equal to the first threshold of quality and the second relationship is that the first code rate is greater than or equal to the recommended code rate, reporting, by the first terminal device, the link quality of the first link to the first network device.

4. The method according to claim 2, wherein the method further comprises:
receiving, by the first terminal device, indication information of the first threshold of quality sent by the first network device.

5. The method according to claim 2, wherein the first threshold of quality is determined according to the recommended code rate.

6. The method according to claim 1, wherein determining, by the first terminal device, the reporting policy for the link quality of the first link according to the link quality of the first link and the first code rate comprises:
performing, by the first terminal device, a reporting process of the link quality of the first link according to a third relationship and a fourth relationship, wherein the third relationship is a relationship between the link quality of the first link and a predetermined second threshold of quality, the fourth relationship is a relationship between the link quality of the first link and a reference quality, and the reference quality is determined according to the first code rate.

7. The method according to claim 6, wherein performing, by the first terminal device, the reporting process of the link quality of the first link according to the third relationship and the fourth relationship comprises:
when the third relationship is that the link quality of the first link is less than or equal to the second threshold of quality and the fourth relationship is that the link quality of the first link is greater than or equal to a first reference quality, not reporting, by the first terminal device, the link quality of the first link to the first network device; or
when the third relationship is that the link quality of the first link is less than or equal to the second threshold of quality and the fourth relationship is that the link quality of the first link is less than a second reference quality, reporting, by the first terminal device, the link quality of the first link to the first network device.

8. The method according to claim 6, wherein the method further comprises:
receiving, by the first terminal device, indication information of the second threshold of quality and the reference quality that are sent by the first network device.

9. The method according to claim 6, wherein the second threshold of quality is determined according to a recommended code rate.

10. A method for wireless communication, comprising:
when a first terminal device and a second terminal device perform wireless communication via a first network device, measuring, by the first terminal device, link quality of a first link, wherein the first link is a link between the first terminal device and the first network device;
determining, by the first terminal device, a reporting policy according to the link quality of the first link; and
when the reporting policy is to report the link quality of the first link, sending, by the first terminal device, indication information of the link quality of the first link and indication information of a first code rate to the first network device, wherein the first code rate is determined according to a code rate applicable to the second terminal device,
wherein the first code rate is a maximum code rate applicable to the second terminal device or a set of code rates applicable to the second terminal device, wherein the first code rate is a code rate indicated by the first network device through a signaling to the first terminal device, and wherein the first code rate is determined independent of negotiation between the first terminal device and the second terminal device.

11. The method according to claim 10, wherein sending, by the first terminal device, indication information of the link quality of the first link and indication information of the first code rate to the first network device comprises:
after determining that the link quality of the first link is greater than or equal to a predetermined first threshold of quality, sending, by the first terminal device, the indication information of the link quality of the first link and the indication information of the first code rate to the first network device, or
after determining that the link quality of the first link is less than or equal to a predetermined second threshold of quality, sending, by the first terminal device, the indication information of the link quality of the first link and the indication information of the first code rate to the first network device.

12. The method according to claim 11, wherein the method further comprises:
receiving, by the first terminal device, indication information of the first threshold of quality or indication information of the second threshold of quality that is sent by the first network device.

13. The method according to claim 11, wherein the first threshold of quality or the second threshold of quality is determined according to a recommended code rate.

14. A device for wireless communication, comprising a processor and a transceiver, wherein
  the processor is configured to measure link quality of a first link when the device and a second terminal device perform wireless communication via a first network device, wherein the first link is a link between the device and the first network device;
  the processor is further configured to determine a reporting policy according to the link quality of the first link and a first code rate, wherein the first code rate is determined according to a code rate applicable to the second terminal device; and
  the transceiver is configured to send indication information of the first code rate to the first network device when the reporting policy is to report the link quality of the first link,
  wherein the first code rate is a maximum code rate applicable to the second terminal device or a set of code rates applicable to the second terminal device, wherein the first code rate is a code rate indicated by the first network device through a signaling to the first terminal device, and wherein the first code rate is determined independent of negotiation between the first terminal device and the second terminal device.

15. The device according to claim 14, wherein the processor is further configured to control the transceiver to perform a reporting process for reporting the link quality for the first link according to a first relationship and a second relationship, wherein the first relationship is a relationship between the link quality of the first link and a predetermined first threshold of quality, the second relationship is a relationship between the first code rate and a recommended code rate, and the recommended code rate is a code rate that, before a current time, the first network device most recently indicates to be used by the device.

16. The device according to claim 15, wherein,
  the processor is configured to control the transceiver not to report the link quality of the first link to the first network device, when the first relationship is that the link quality of the first link is greater than or equal to the first threshold of quality and the second relationship is that the first code rate is less than the recommended code rate; or
  the processor is configured to control the transceiver to report the link quality of the first link to the first network device, when the first relationship is that the link quality of the first link is greater than or equal to the first threshold of quality and the second relationship is that the first code rate is greater than or equal to the recommended code rate.

* * * * *